United States Patent
Goodman et al.

(10) Patent No.: US 6,725,352 B2
(45) Date of Patent: Apr. 20, 2004

(54) METHOD TO PARTITION A DATA STORAGE AND RETRIEVAL SYSTEM INTO ONE OR MORE LOGICAL LIBRARIES

(75) Inventors: Brian Gerard Goodman, Tucson, AZ (US); Ronald Faye Hill, Jr., Tucson, AZ (US); Timothy K. Pierce, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 09/878,469

(22) Filed: Jun. 11, 2001

(65) Prior Publication Data

US 2002/0199077 A1 Dec. 26, 2002

(51) Int. Cl.⁷ ............................................... G06F 12/00
(52) U.S. Cl. ......................................... 711/173; 711/153
(58) Field of Search .................................. 711/170, 173, 711/153, 111

(56) References Cited

U.S. PATENT DOCUMENTS 6,185,165 B1 * 2/2001 Jesionowski et al. ..... 369/30.34
6,425,059 B1 * 7/2002 Basham et al. ............. 711/153

* cited by examiner

Primary Examiner—Reba I. Elmore
Assistant Examiner—Kathy Takeguchi
(74) Attorney, Agent, or Firm—Dale F. Regelman

(57) ABSTRACT

A method to partition a data storage and retrieval system into one or more logical libraries, where that data storage and retrieval system includes a library controller, one or more data storage drives and one or more control ports. A data storage and retrieval system which includes a computer useable medium having computer readable program code disposed therein to implement Applicants' method to partition the data storage and retrieval system into one or more logical libraries. A computer program product usable with a programmable computer processor having computer readable program code embodied therein for partitioning Applicants' data storage and retrieval system into one or more logical libraries.

15 Claims, 34 Drawing Sheets

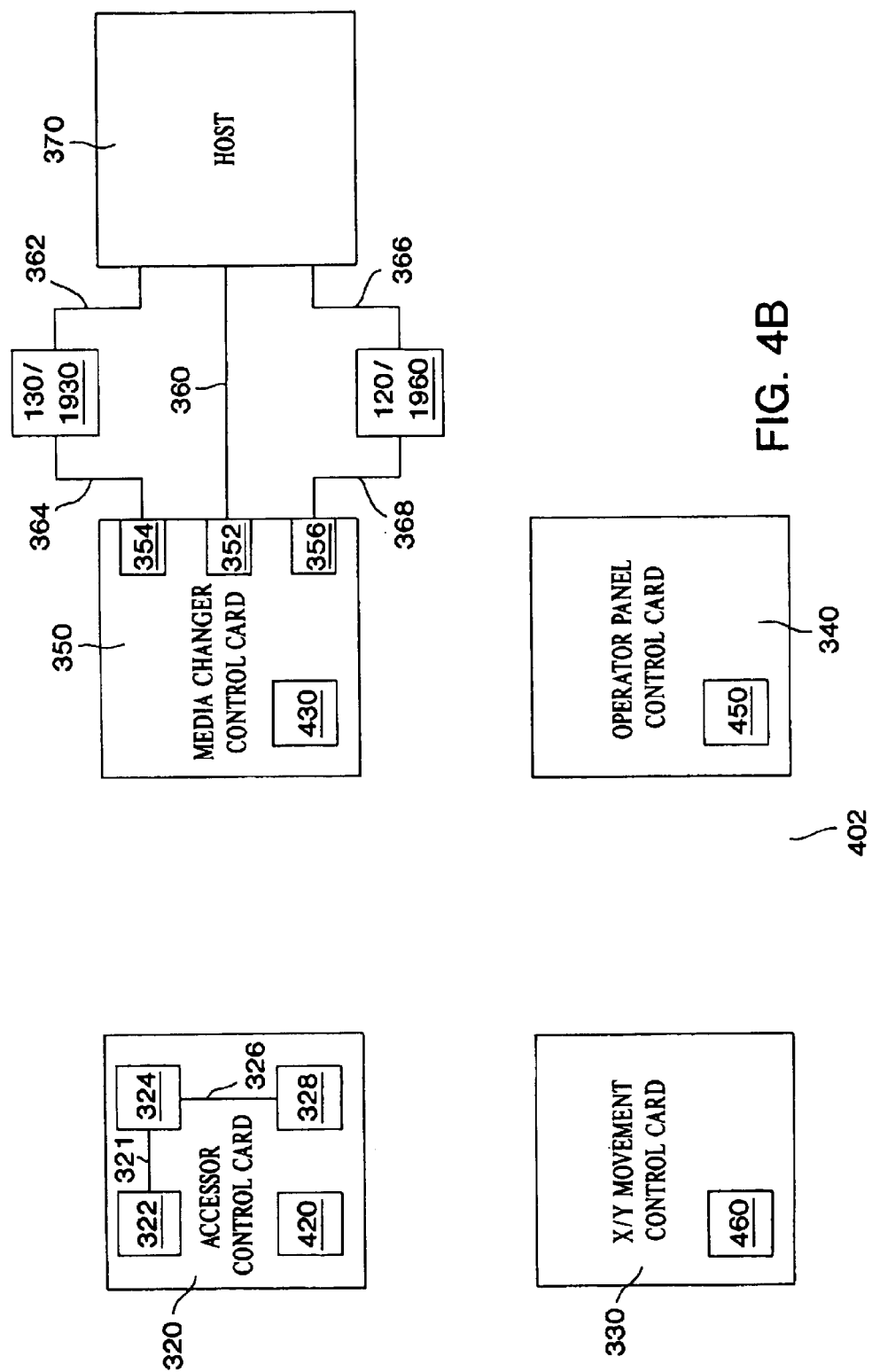

| POTENTIAL LOGICAL LIBRARY | 710 | 720 | 730 | 740 | 750 | 760 |
|---|---|---|---|---|---|---|
| DRIVES | 612<br>614 | 622<br>624<br>626 | 642<br>644 | 652 | 662<br>664<br>666<br>668 | 672<br>674<br>676 |
| CONTROL PORTS | 610 | 620 | 630<br>640 | 650 | 660 | 670 |

| POTENTIAL LOGICAL LIBRARY | 710 | 720 | 730 | 740 | 750 | 760 |
|---|---|---|---|---|---|---|
| DRIVES | 612 614 | 622 624 626 | 642 644 | 652 | 662 664 666 668 | 672 674 676 |
| CONTROL PORTS | 610 | 620 | 630 640 | 650 | 660 | 670 |

FIG. 11

| POTENTIAL LOGICAL LIBRARY | 710 | 720 | 730 | 740 | 750 | 760 |
|---|---|---|---|---|---|---|
| DRIVES | 612<br>614 | 622<br>624<br>626 | 642<br>644 | 652 | 662<br>664<br>666<br>668 | 672<br>674<br>676 |
| CONTROL PORTS | 610 | 620 | 630<br>640 | 650 | 660 | 670 |
| | LOGICAL LIBRARY 1210 | | | LOGICAL LIBRARY 1220 | | |

| POTENTIAL LOGICAL LIBRARY | 710 | 720 | 730 | 740 | 750 | 760 |
|---|---|---|---|---|---|---|
| DRIVES | 612<br>614 | 622<br>624<br>626 | 642<br>644 | 652 | 662<br>664<br>666<br>668 | 672<br>674<br>676 |
| CONTROL PORTS | 610 | 620 | 630<br>640 | 650 | 660 | 670 |

FIG. 13

| POTENTIAL LOGICAL LIBRARY | 710 | 720 | 730 | 740 | 750 | 760 |
|---|---|---|---|---|---|---|
| DRIVES | 612 614 | 622 624 626 | 642 644 | 652 | 662 664 666 668 | 672 674 676 |
| CONTROL PORTS | 610 | 620 | 630 640 | 650 | 660 | 670 |

LOGICAL LIBRARY 1410

| POTENTIAL LOGICAL LIBRARY | 710 | 720 | 730 | 740 | 750 | 760 |
|---|---|---|---|---|---|---|
| DRIVES | 612 614 | 622 624 626 | 642 644 | 652 | 662 664 666 668 | 672 674 676 |
| CONTROL PORTS | 610 | 620 | 630 640 | 650 | 660 | 670 |

LOGICAL LIBRARY 1410

| POTENTIAL LOGICAL LIBRARY | 710 | 720 | 730 | 740 | 750 | 760 |
|---|---|---|---|---|---|---|
| DRIVES | 612<br>614 | 622<br>624<br>626 | 642<br>644 | 652 | 662<br>664<br>666<br>668 | 672<br>674<br>676 |
| CONTROL PORTS | 610 | 620 | 630<br>640 | 650 | 660 | 670 |
| | LOGICAL LIBRARY 1410 | | LOGICAL LIBRARY 1610 | | | |

| POTENTIAL LOGICAL LIBRARY | 710 | 720 | 730 | 740 | 750 | 760 |
|---|---|---|---|---|---|---|
| DRIVES | 612 614 | 622 624 626 | 642 644 | | 662 664 666 668 | 672 674 676 |
| CONTROL PORTS | 610 | 620 | 630 640 | 650 | 660 | 670 |
| | LOGICAL LIBRARY 1410 | | LOGICAL LIBRARY 1610 | | LOGICAL LIBRARY 1710 | |

| PARAMETER | LOGICAL LIBRARY 1410 m=1 | LOGICAL LIBRARY 1610 m=2 | LOGICAL LIBRARY 1710 m=3 |
|---|---|---|---|
| Number of logical libraries to configure, $V_m$ | $V_1 = 3$ | $V_2 = 2$ | $V_3 = 1$ |
| Number of unallocated potential logical libraries, $T_m$ | $T_1 = 6$ | $T_2 = 4$ | $T_3 = 2$ |
| Maximum number of potential logical libraries available for mth virtual library, $I_{m\,MAX}$ | $I_{1\,MAX} = 4$ | $I_{2\,MAX} = 3$ | $I_{3\,MAX} = 2$ |
| Number of potential logical libraries selected for mth logical library, $I_m$ | $I_1 = 2$ | $I_2 = 2$ | $I_3 = 2$ |
| Total number of logical libraries allocated after configuring mth library, $A_m$ | $A_m = 2$ | $A_2 = 4$ | $A_3 = 6$ |

FIG. 18

```
/************************* *********************** ******* *********  *  ***/
/*      STEP 520 / 530 – Create device may / Determine number of potential logical libraries  */
/*   index          =   loop control                                                          */
/*   deviceType     =   type of device at index position                                      */
/*   drives         =   number of drives between potential boundary                           */
/*   cports         =   number of cports between potential boundary                           */
/*   potentialLogLib =  number of potential logical libraries                                 /
/*   phy[]          =   array representing physical mapping of devices                        */
/*   numSlots       =   number of slots devices span                                          /
/*   positionStart  =   tracks where in array to start calculation of min drives              */
/*   currentLogLib  =   logical library that user is configuring                              /
/*   numPotential   =   number of potential logical libraries                                 /
/*   remPotential   =   potential logical libraries reserved for remaining logical libraries  /
/*   NumLibraries   =   remaining logical libraries to configure                              /
/*   library[]      =   array representing the number of drives for each logical library      */
/*   UserDrives     =   number of drives selected for current logical library                 /
/*************************************************************************************** */
NumSlots = 0;

For (index = 1; index <= MAX_SLOTS_IN_LIBRARY; index++)
{
        /*********************************************************************** **/
        /*  Ascertain if a device is disposed in slot, if device is present ascertain if that device  */
        /*              comprises a control port or a data storage drive           /
        /*********************************************************************** / deviceType = getDeviceType(index);

if (deviceType == DRIVE)
        {
                drives++;
                remainingDrives++;
        } if (deviceType == CPORT)
                cports++;

if ((drives >= 1) && (cports >=1))
        {
                PotentialLogLib++;
                cports = 0;
                drives = 0;
        } numSlots++;
        phy[numSlots] = deviceType;
} positionStart = 1;
currentLogLib = 1;
```

FIG. 22A

```
/******************************************************************/
/*        STEP 540 - User enters NumLibraries from 1 to PotentialLogLib      */
/******************************************************************/

/******************************************************************/
/*        STEP 2110 - If User selects 1 NumLibrary, goto step 2180          */
/******************************************************************/ while (Numlibraries > 1)
{

/******************************************************************/
/*   STEP 2120 - Determine minimum number of drives allowed for current logical library   */
/******************************************************************/ numPotential = 0;
        index = positionStart;
        cports = 0;
        drives = 0;

while (numPotential < 1)
        {
                if (phy[index] == DRIVE)
                        drives++;

if (phy[index] == CPORT)
                        cports++;

if ((drives >=1) && (cports >=1))
                {
                        min = drives;
                        numPotential++;
                } index++;
        }
}
```

FIG. 22B

```
/***********************************************************************/
/*       STEP 2130 - Find last selectable drive position for current logical library    */
/***********************************************************************/ cport = 0;
    drives = 0;
    index = numSlots;
    for (remPotential = 0; remPotential < NumLibraries - 1;)
    {
            if (phy[index] == DRIVE)
                    drives++;

if (phy[index] == CPORT)
                    cports++;

if ((drive >=1 ) && (cport >=1))
            {
                    remPotential++;
                    cports = 0;
                    drives = 0;
            } index--;
    }

/***********************************************************************/
/*  STEP 2140 - Determine maximum number of selectable drives for current logical library  */
/*                        using index from step 2130                                       */
/***********************************************************************/ max = 0;

for (index; index >= positionStart; index--)
    {
            if (phy[index] == DRIVE)
                    max++;
    }
```

FIG. 22C

```
/*********************  *****  *************  ************   ********  *********/
/*      STEP 2150 –Select number of drives for current logical library and recompute     /
/*                      remaining drives; User enters UserDrives                         */
/***************************************************************************** */ remainingDrives -= UserDrives;
        library[currentLogLib] = UserDrives;

/*******************************************************************************/
/*      STEP 2160 – Decrement number of remaining libraries and increment current library    */
/*******************************************************************************/ currentLogLib++;
        NumLibraries--;

/*******************************************************************************/
/*         STEP 2170 – If more than one logical library remains to be configured,    */
/*                     determine positionStart for next logical library              */
/*******************************************************************************/ if (NumLibraries > 1)
        {
                drives = 1;
                cports = 0;
                index = positionStart;

while ((drives >= UserDrives) || (cports == 0))
                {
                        if (phy[index] == DRIVE)
                                drives++;

if (phy[index] == CPORT)
                                cports++;

index++;
                } positionStart = index;
        }
}

/*******************************************************************************/
/*            STEP 2180 – Configure last logical library with remaining drives       */
/*******************************************************************************/ library[currentLogLib] = remainingDrives;
```

FIG. 22D

METHOD TO PARTITION A DATA STORAGE AND RETRIEVAL SYSTEM INTO ONE OR MORE LOGICAL LIBRARIES

FIELD OF THE INVENTION

Applicants' invention relates to a method to partition a data storage and retrieval system into one or more logical libraries. Applicants' invention further relates to a data storage and retrieval system which includes a computer useable medium having computer readable program code disposed therein for partitioning Applicants' data storage and retrieval system into one or more logical libraries. Applicants' invention further relates to computer program product usable with a programmable computer processor having computer readable program code embodied therein for partitioning a data storage and retrieval system into one or more logical libraries.

BACKGROUND OF THE INVENTION

Automated media storage libraries are known for providing cost effective access to large quantities of stored media. Generally, media storage libraries include a large number of storage slots in which are stored data storage media. The portable data storage media are typically housed in a portable container, such as a tape cartridge, an optical cartridge, and the like. One (or more) accessors typically access the data storage media from the storage slots and delivers the accessed media to a data storage drive for reading and/or writing data on the accessed media. Suitable electronics operate the accessor(s) and operate the data storage drive(s) to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy and/or improved performance.

It would be advantageous to be able to share a data storage and retrieval system among multiple hosts and therefore amortize the cost of that system more widely. It is often difficult, however, to design components that can respond to multiple hosts. Sharing a data library using prior art apparatus and methods generally requires that special host software be installed on each host computer. Such software allows communication between differing hardware platforms using differing operating systems. In addition, using prior art methods such library sharing generally requires the addition of a cumbersome layer of supervisory software code in the library, which both increases the need for processing capability of the library and which can ultimately reduce the performance of other aspects of the library. Requiring end-users to develop software for an automated data storage and retrieval library to enable multiple incompatible hosts to manage a shared inventory may require a redesign of the library programming and may be sufficiently expensive as to be prohibitive for the low cost environment.

In the low cost environment where hosts and libraries alike often comprise mass produced devices what is needed is an easy-to-use, automated process, to partition a data storage and retrieval system into one or more logical libraries thereby achieving a library sharing capability which does not require special host software or modification to any of the components of the mass produced data storage and retrieval system. Applicants' method to partition a data storage and retrieval system into one or more logical libraries fulfills these requirements. In addition, Applicants' method comprises an automated process which prevents a user from incorrectly configuring Applicants' data storage and retrieval system.

SUMMARY OF THE INVENTION

Applicants' invention includes a method to partition a data storage and retrieval system into one or more logical libraries, where that data storage and retrieval system includes a library controller, at least one data storage drive and at least one control port. A control port provides a control path into the data storage and retrieval system. Devices such as control ports and data storage drives are arranged in device slots by the library manufacturer, and/or by the user, and/or by repair personnel. Using Applicants' method, a data storage and retrieval system can be partitioned into smaller virtual libraries called logical libraries.

A logical library comprises a subset of the complete physical data storage and retrieval system, where that logical library includes at least one data storage drive and at least one control port. In other words, storage slots, data storage drives, and control ports disposed in a data storage and retrieval system can be partitioned into smaller logical libraries which share common robotic resources, i.e. robotic accessors. Applicants' method includes the steps of identifying each of the control ports and data storage drives, determining the number of potential logical libraries that could be configured using those control ports and data storage drives, selecting the number (N) of logical libraries to configure, and partitioning the data storage and retrieval system into those (N) logical libraries.

Applicants' invention further includes a data storage and retrieval system which includes a computer useable medium having computer readable program code disposed therein for partitioning Applicants' data storage and retrieval system into one or more logical libraries. Applicants' invention further includes a computer program product usable with a programmable computer processor having computer readable program code embodied therein for partitioning Applicants' data storage and retrieval system into one or more logical libraries.

BRIEF DESCRIPTION OF THE DRAWINGS

The invention will be better understood from a reading of the following detailed description taken in conjunction with the drawings in which like reference designators are used to designate like elements, and in which:

FIG. 4B is a schematic showing a third embodiment of Applicants' distributed control network which includes a plurality of controller elements and four wireless communication devices

FIG. 9 summarizes the six potential logical libraries of system 600 and the data storage drives associated with those potential logical libraries;

FIG. 11 shows the maximum number of potential logical libraries available for a first logical library where the system of FIG. 6 is partitioned into two logical libraries using the method of FIG. 11;

FIG. 12 shows two logical libraries configured from the system of FIG. 6 using the method of FIG. 11;

FIG. 13 shows the maximum number of potential logical libraries available for allocation to a first logical library where the system of FIG. 6 is partitioned into three logical libraries using the method of FIG. 11;

FIG. 14 shows the first logical library of FIG. 13 comprising two potential logical libraries;

FIG. 15 shows the maximum number of potential logical libraries available using the method of FIG. 11 for allocation to a second logical library where the system of FIG. 6 is partitioned into three logical libraries and where the first logical library is configured to include two potential logical libraries;

FIG. 16 shows the second logical library of FIG. 15 comprising two potential logical libraries;

FIG. 17 shows three logical libraries configured from the system of FIG. 6 using the method of FIG. 11;

FIG. 18 summarizes the variables used to configure the three logical libraries of FIG. 17;

FIG. 22A recites computer code to implement certain steps of Applicants' method of FIG. 21;

FIG. 22B recites computer code to implement certain steps of Applicants' method of FIG. 21;

FIG. 22C recites computer code to implement certain steps of Applicants' method of FIG, 21;

FIG. 22D recites computer code to implement certain steps of Applicants' method of FIG. 21;

DETAILED DESCRIPTION OF THE PREFERRED EMBODIMENTS

Figure 1:
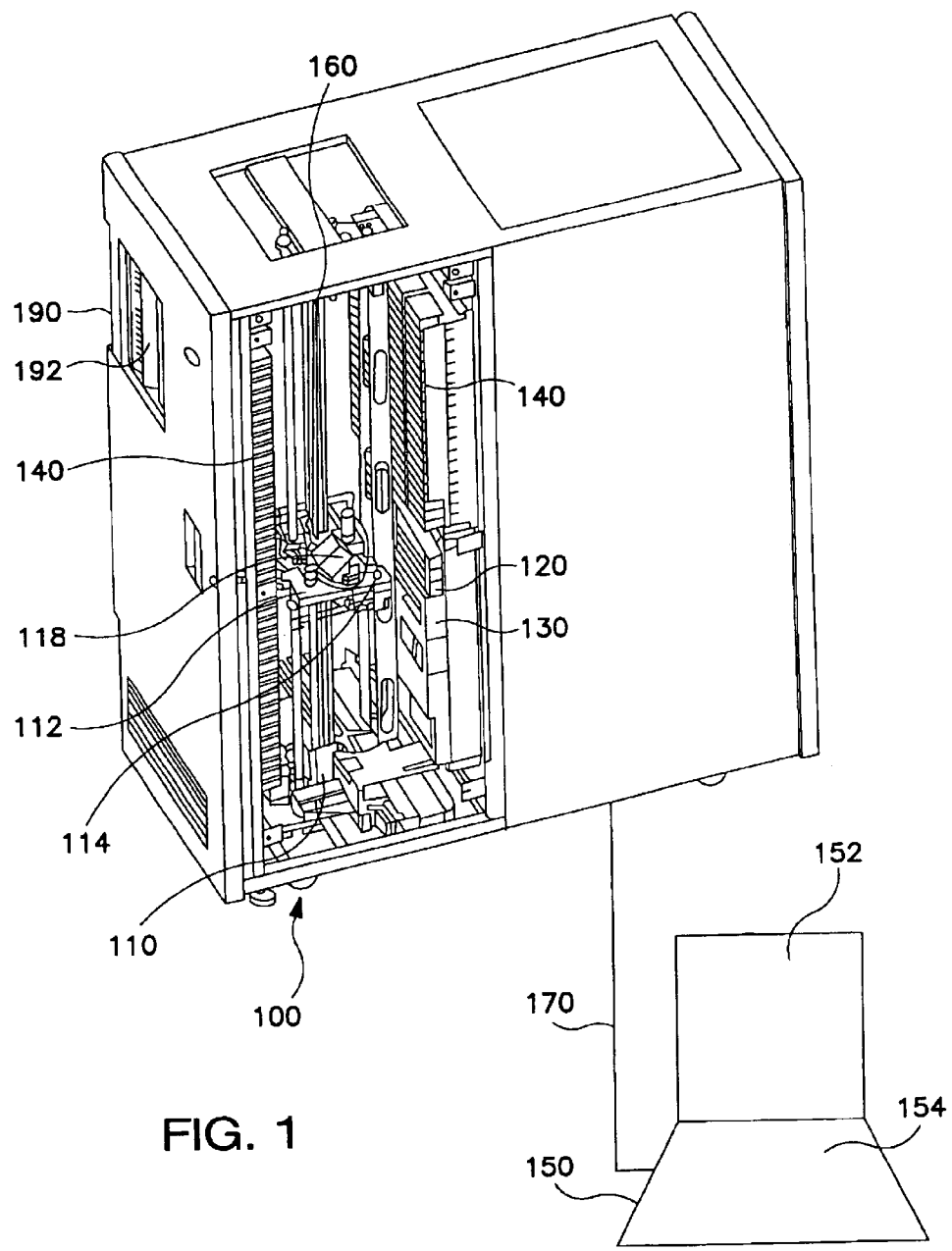
FIG. 1 is a perspective view of one embodiment of Applicants' data storage and retrieval system which includes an external library controller.

FIG. 1 shows information storage and retrieval system 100. System 100 includes one or more data storage drives, such as drive 130. Drive 130 comprises a floppy disk drive, an optical disk drive, a magnetic tape drive, and the like. System 100 further includes one or a plurality of portable data storage cartridges 140 stored in one or a plurality of storage slots 160. Each cartridge contains a data storage media internally disposed therein. Such data storage media includes a hard disk drive, optical media, magnetic media, tape media, and the like.

Figure 3:
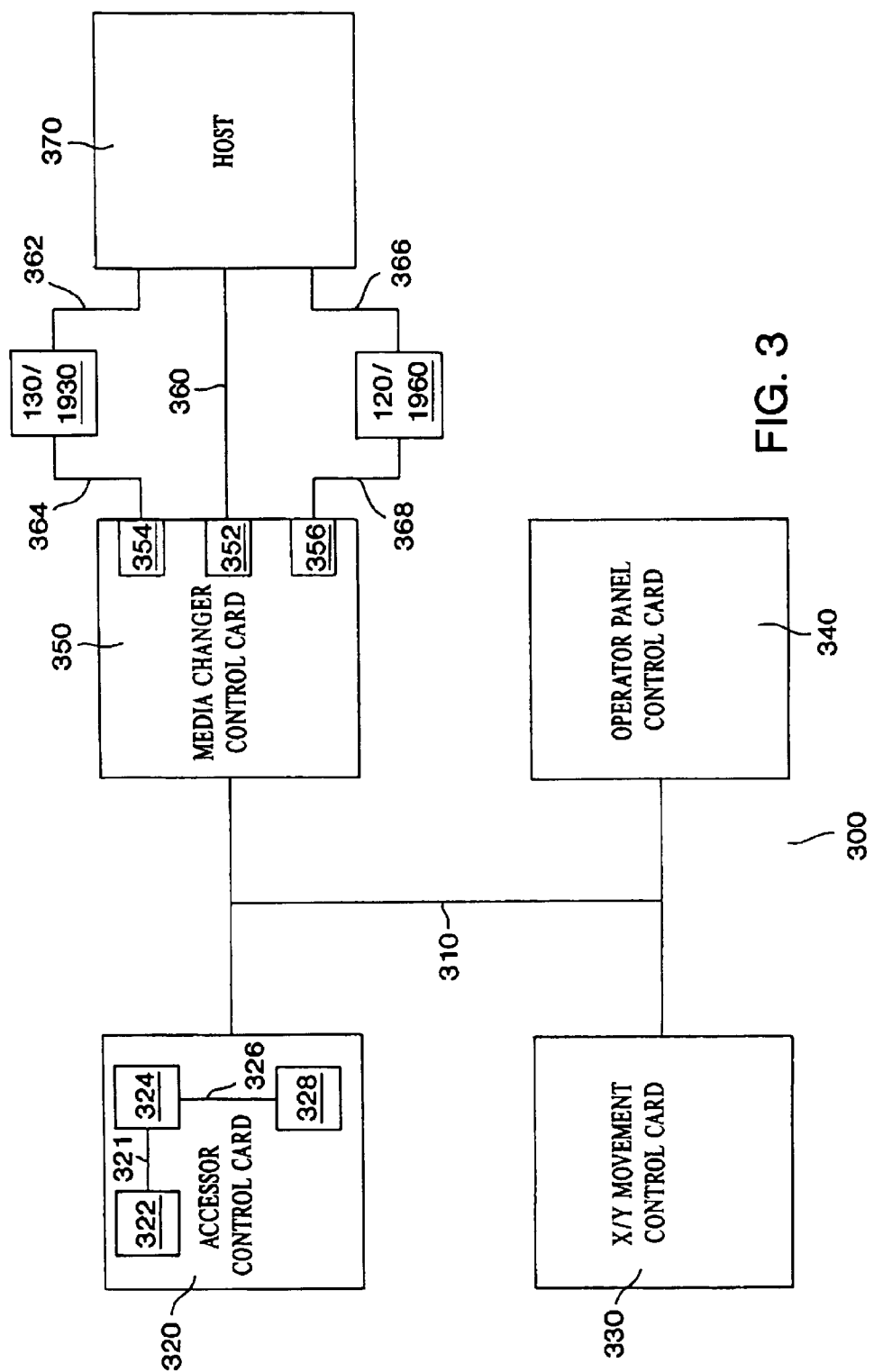
FIG. 3 is a schematic showing a first embodiment of Applicants' distributed control network which includes a plurality of controller elements and a communication bus disposed within Applicants' data storage and retrieval system.
Figure 4A:
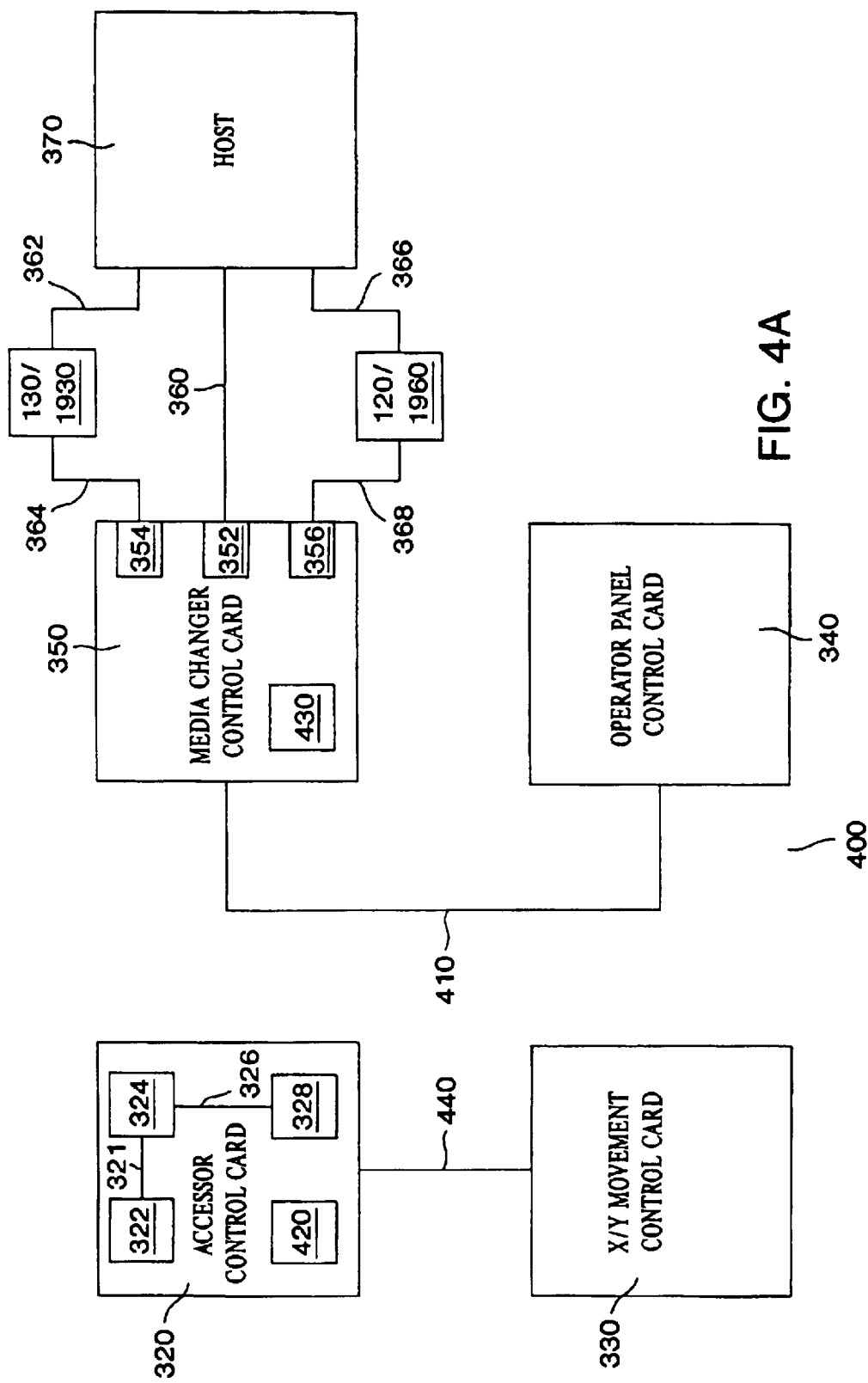
FIG. 4A is a schematic showing a second embodiment of Applicants' distributed control network which includes a plurality of controller elements and two wireless communication devices.

System 100 also includes at least one robotic accessor 110 for transporting a specified portable data storage cartridge 140 between a storage cell 160 and a data storage drive 130. Accessor 110 includes lifting servo section 112 on which is disposed at least one cartridge gripping mechanism 114. Data storage drive 130 is connected to host computer 370 (FIGS. 3, 4A, 4B). Control port 120 provides a control path into library 100. In certain embodiments, data storage drive 130 and control port communicate with host computer 370 through the same connection.

In the embodiment shown in FIG. 1, system 100 also includes external system controller 150 in communication via communication link 170 with, and controlling the operation of, accessor 110. System 150 includes visual display device 152 and data input device 154. Import/export station 190 includes access door 192 pivotably attached to the side of system 100. Portable data storage cartridges can be placed in the system, or in the alternative, removed from the system, via station 190/access door 192.

System controller 150 further includes at least one computing processor. In certain embodiments, system controller 150 is in communication with host computer 370 (FIGS. 3,4A,4B) from which system controller 150 receives instructions. Data to be recorded onto, or read from, a selected portable data storage cartridge is communicated between drive 130 and host computer 370 either via system controller 150, or directly between drive 130 and host computer 370.

Figure 2:
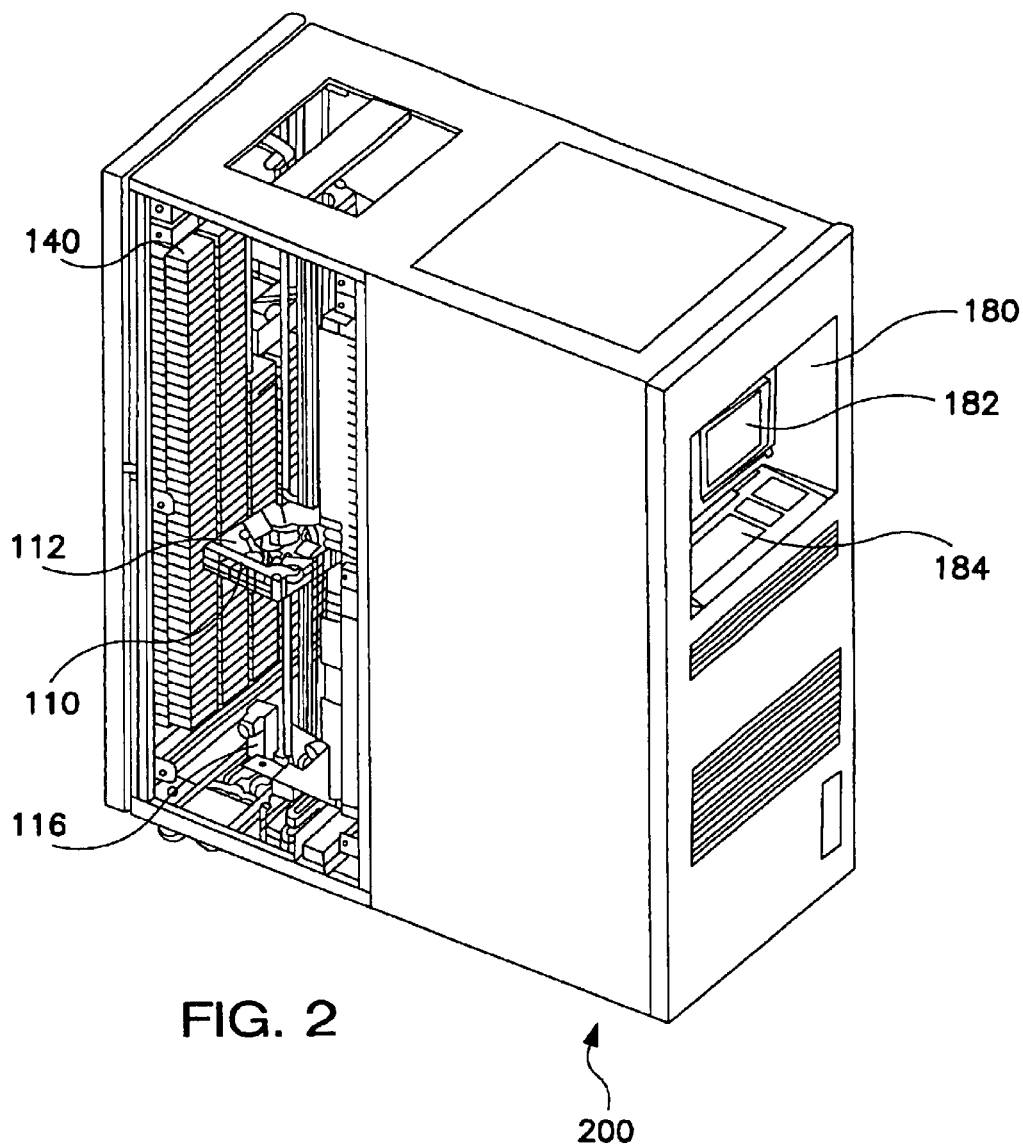
FIG. 2 is a perspective view of an alternative embodiment of Applicants' data storage and retrieval system which utilizes a distributed control system.

Referring to FIG. 2, system 200 includes operator input panel 180 comprising visual display device 182 and data input device 184. System 200 further includes a distributed control system wherein four (4) different control cards are located within system 200. Those four control cards are shown in FIGS. 3, 4A, and 4B, and include accessor control card 320, X/Y movement control card 330, operator panel control card 340 and media changer control card 350.

Figure 19:
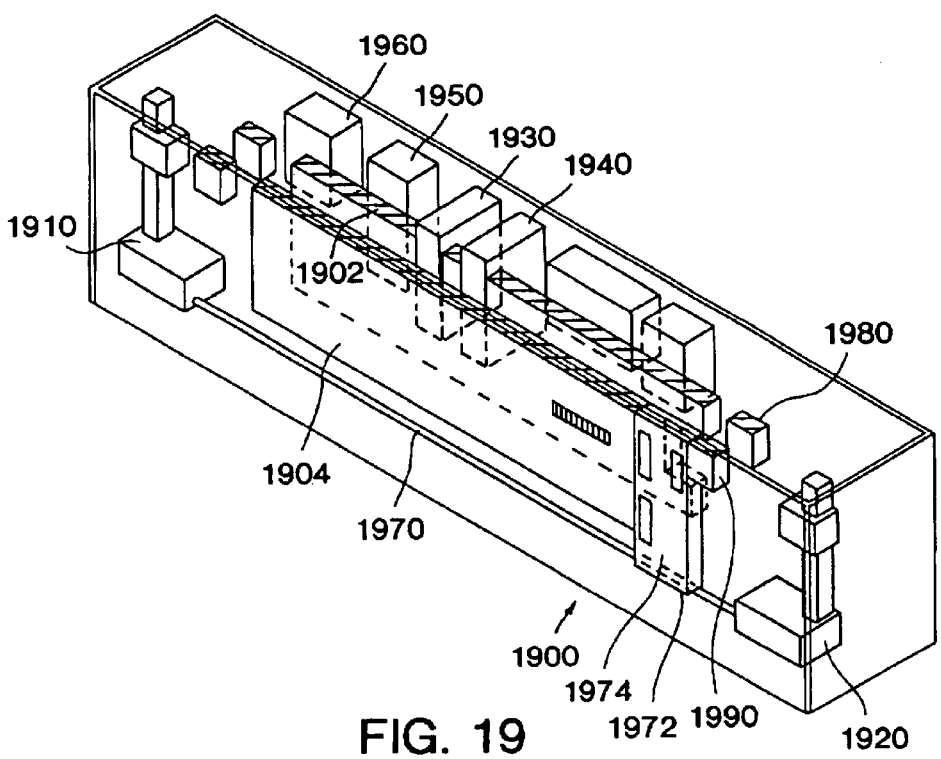
FIG. 19 is a perspective view of a third embodiment of Applicants' data storage and retrieval system.

Referring to FIG. 19, Applicant's automated data storage and retrieval system 1900 is shown having a first wall of storage slots 1902 and a second wall of storage slots 1904. Portable data storage media are individually stored in these storage slots. Certain of these data storage media are disposed within a portable container. Examples of such data storage media include magnetic tapes, optical disks of various types, including ROM, WORM, and rewritable, and the like.

Automated data storage and retrieval system 1900 includes one or more accessors, such as accessors 1910 and 1920. As shown in FIG. 19, accessors 1910 and 1920 travel bi-directionally along rail 1970 in an aisle disposed between first wall of storage slots 1902 and second wall of storage slots 1904. Accessors 1910 and 1920 retrieve portable data storage cartridges disposed in first storage wall 1902 and second storage wall 1904, and transport those cartridges to data storage drive 1930 or to data storage drive 1940.

Operator input station 1950 permits a user to communicate with Applicant's automated data storage and retrieval system 1900. Control port 1960 provides a control path into data storage and retrieval system 1900. Power component 1980 and power component 1990 each comprise one or more power supply units which supply power to the individual components disposed within Applicant's automated data storage and retrieval system. Import/export station 1972 includes access door 1974 pivotably attached to the side of system 1900. Portable data storage cartridges can be placed in the system, or in the alternative, removed from the system, via station 1972/access door 1974.

Figure 20:
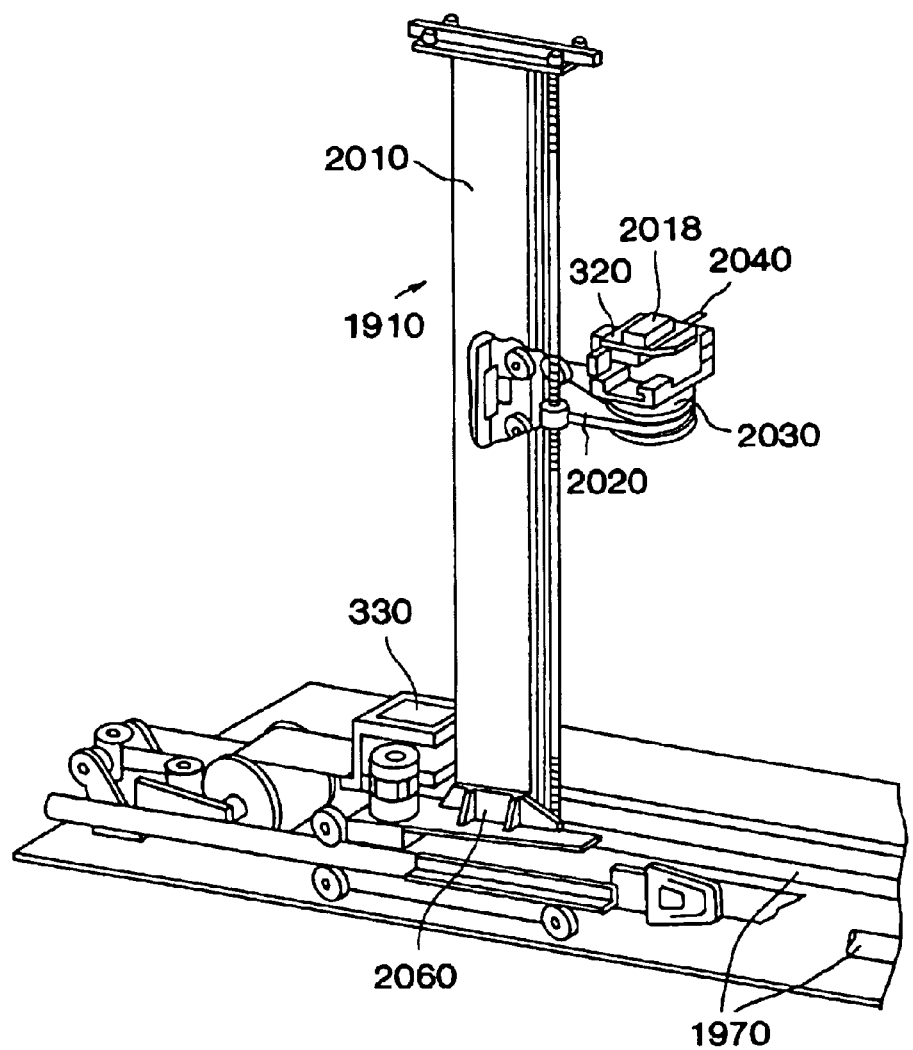
FIG. 20 is a perspective view of Applicants' accessor moveably disposed within the data storage and retrieval system of FIG. 19.

Referring to FIG. 20, accessor 1910 travels bi-directionally along rail system 1970. In the embodiment shown in FIG. 20, rail system 1970 comprises two parallel rails. Accessor 1910 includes vertical pillar 2010 which connects to carriage assembly 2060. Lifting servo section 2020 moves vertically along pillar 2010. In the embodiment shown in FIG. 20, accessor 1910 includes first gripper mechanism 2030, second gripper mechanism 2040, and accessor control card 320 (FIGS. 3, 4A, 4B). In the embodiment shown in FIG. 20, X/Y movement control card 330 (FIGS. 3, 4A, 4B) is disposed on carriage assembly 2060. Data storage and retrieval system 1900 employs the distributed control network shown in FIGS. 3, 4A, and 4B. Accessor 1920 (FIG. 19) is similarly configured.

FIG. 3 shows distributed control network 300 which comprises communication bus 310 interconnecting accessor control card 320, X/Y movement control card 330, operator panel control card 340 and media changer control card 350. In certain embodiments, bus 310 comprises an ethernet interconnection or a CANbus interconnection. Those skilled in the art will appreciate that CANbus technology was developed in the automotive industry, but now has gained wide acceptance in other industries.

Accessor control card 320 is disposed on lifting servo section 112 (FIG. 2) of accessor 110 (FIG. 2) and on lifting servo section 2020 of accessor 1910 (FIGS. 19, 20). Accessor control card includes microprocessor 324. Microprocessor 324 functions in this embodiment as the library controller. Microprocessor 324 includes RAM memory. In certain embodiments, battery 322 provides power to that RAM memory via conductor 321. Accessor control card 320 also includes non-volatile memory device 328. Memory device 328 is connected with microprocessor 324 via communication link 326. Alternatively, nonvolatile memory device 328 may be contained in microprocessor 324, and/or the RAM memory may be external to microprocessor 324.

X/Y movement control card 330 is disposed on base portion 116 (FIG. 2) of accessor 110 (FIG. 2), and on carriage portion 2060 of accessors 1910/1920 (FIGS. 19, 20). Operator panel control card 340 is disposed within systems 200 (FIG. 2)/1900 (FIG. 19) and is connected to visual display device 182 (FIG. 2)/data input device 184 (FIG. 2) and operator control panel 1950, respectively. In the embodiments shown in FIGS. 3, 4A, and 4B, media changer control card 350 includes interfaces 352, 354, and 356.

In certain embodiments, host computer 370 communicates with media changer control card 350 via communication link 360 and interface 352. Communication link 360 and interface 352 comprise one control path into Applicants' system. In certain embodiments, host computer 370 communicates with media changer control card 350 via control port 120 (FIG. 1)/control port 1960 (FIG. 19) using communication links 366/368 and interface 356. Control port 120/1960 in combination with links 366/368 and interface 356 provides a second control path into Applicants' system.

In certain embodiments, host computer 370 communicates directly with data storage drives 130 (FIG. 1)/1930 (FIG. 19)/1940 (FIG. 19) via communication link 362. In these embodiments, drives 130/1930/1940 communicate with media changer control card 350 via communication link 364 and interface 354. In still other embodiments, host computer 370 communicates with media changer control card 350 via communication link 360/interface 352, through control port 120/1960 using links 366/368 and interface 356, and through data storage drive 130/1930/1940 using links 362/364. Communication links 360, 362, 364, 366, and 368, are each selected from the group comprising a serial interface, such as an RS-422 cable or an RS-232 cable, a local area network, a private wide area network, a public wide area network, a SCSI bus, a Fibre Channel bus, and combinations thereof.

FIG. 4A shows embodiment 400 of Applicants' distributed control network. In this embodiment, accessor control card 320 includes wireless communication device 420. Media changer control card 350 includes wireless communication device 430. Communication link 440 interconnects accessor control card 320 and X/Y control card 330. Communication link 410 interconnects operator panel control card 340 and media changer control card 350.

Media changer control card 350 and/or operator panel control card 340 communicates with accessor control card 320 and/or X/Y movement control card 330 via wireless communication using wireless communication devices 420 and 430. Such wireless communication employs emissions in the infrared spectrum, emissions in the visible light spectrum, frequencies from about 1 MHz to about 10 GHz, and combinations thereof.

FIG. 4B shows embodiment 402 of Applicants' distributed control network. In this embodiment, X/Y movement control card 330 includes wireless communication device 460 and operator panel control card includes wireless communication device 450. Accessor control card 320, X/Y movement control card 330, operator panel control card 340, and media changer control card 350, communicate with one another via wireless communication using wireless communication devices 420, 430, 450, and 460. Such wireless communication employs emissions in the infrared spectrum, emissions in the visible light spectrum, frequencies from about 1 MHz to about 10 GHz, and combinations thereof.

Figure 5:
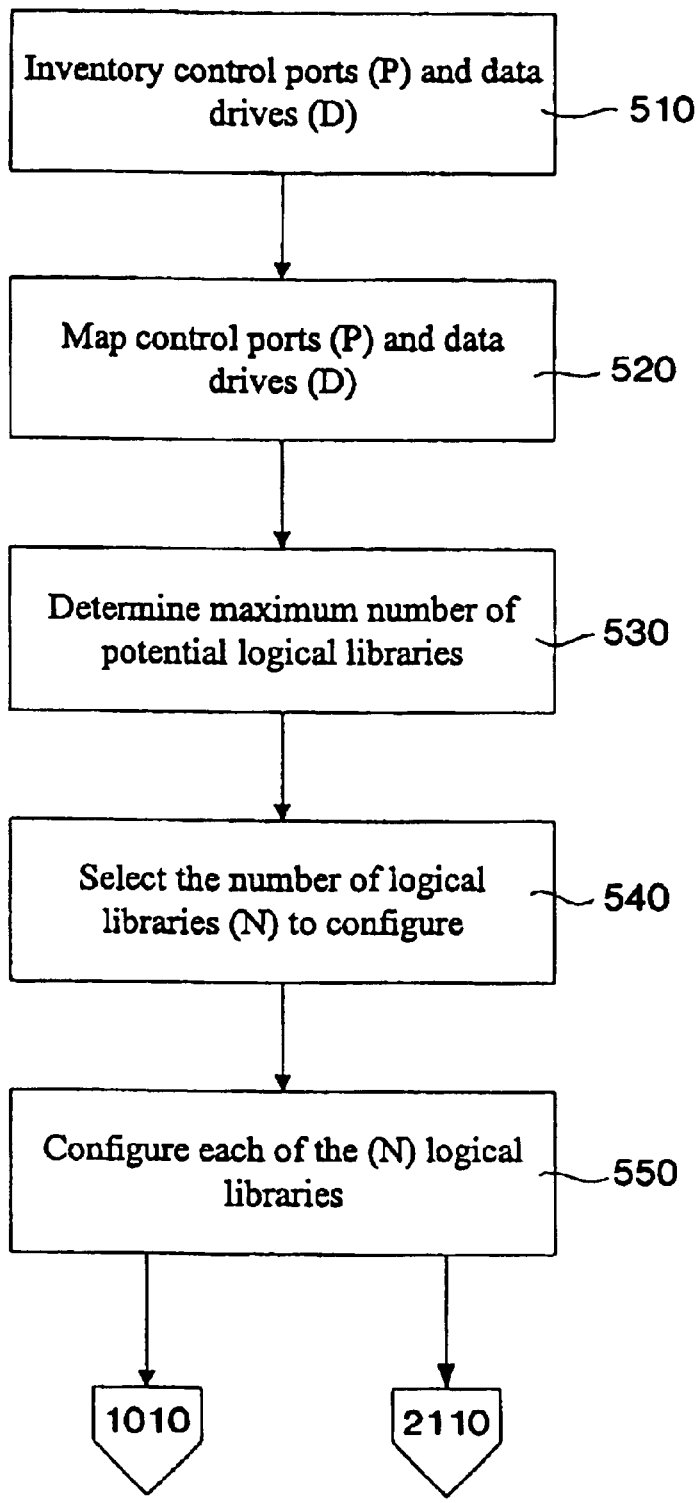
FIG. 5 is a flowchart summarizing Applicants' method to partition Applicants' data storage and retrieval system into one or more logical libraries.

FIG. 5 summarizes the initial steps in Applicants' method to partition their data storage and retrieval system into one or more logical libraries. In step 510, the system identifies system resources, including control ports and data storage drives. In certain embodiments, this process is implemented by microprocessor 324 (FIGS. 3, 4A, 4B) disposed on accessor control card 320 (FIGS. 3, 4A, 4B). In alternative embodiments, this process is implemented by external library controller 150 (FIG. 1). In still other embodiments, this process is implemented by a microprocessor disposed on media changer control card 350.

Identification of system resources is accomplished using differing means in various embodiments. For example, in certain embodiments the user manually enters the identities and locations of each control port and data storage drive. In alternative embodiments, the library controller, i.e. external controller 150 (FIG. 1) or microprocessor 324 (FIGS. 3, 4A, 4B) queries each control port and data storage drive. In response to that query, each control port and data storage drive reports its identity, location, and interconnections.

In yet other embodiments, each control port and each data storage drive include a machine-readable identifier, such as a bar code label. In these embodiments, at least one accessor movably disposed with the data storage and retrieval system includes reading device 118 (FIG. 1)/reading device 2018 (FIG. 20), such as a bar code reader, to read the machine-readable identifiers disposed on the control ports and data storage drives. For example, reading device 118 (FIG. 1) is disposed on lifting servo section 112 (FIG. 1) of accessor 110 (FIG. 1), and reading device 2018 (FIG. 20) is disposed on lifting servo section 2020 of accessor 1910/1920, such that accessor 110/1910/1920 can position device 118/2018 adjacent the machine-readable identifier disposed on each control port/data storage drive. External controller 150 (FIG. 1) or microprocessor 324 (FIGS. 3, 4A, 4B) instructs accessor 110/1910/1920 to sequentially read the bar code labels disposed on each control port and on each data storage drive, and to communicate those bar code identifiers to external controller 150/microprocessor 324.

Figure 6:
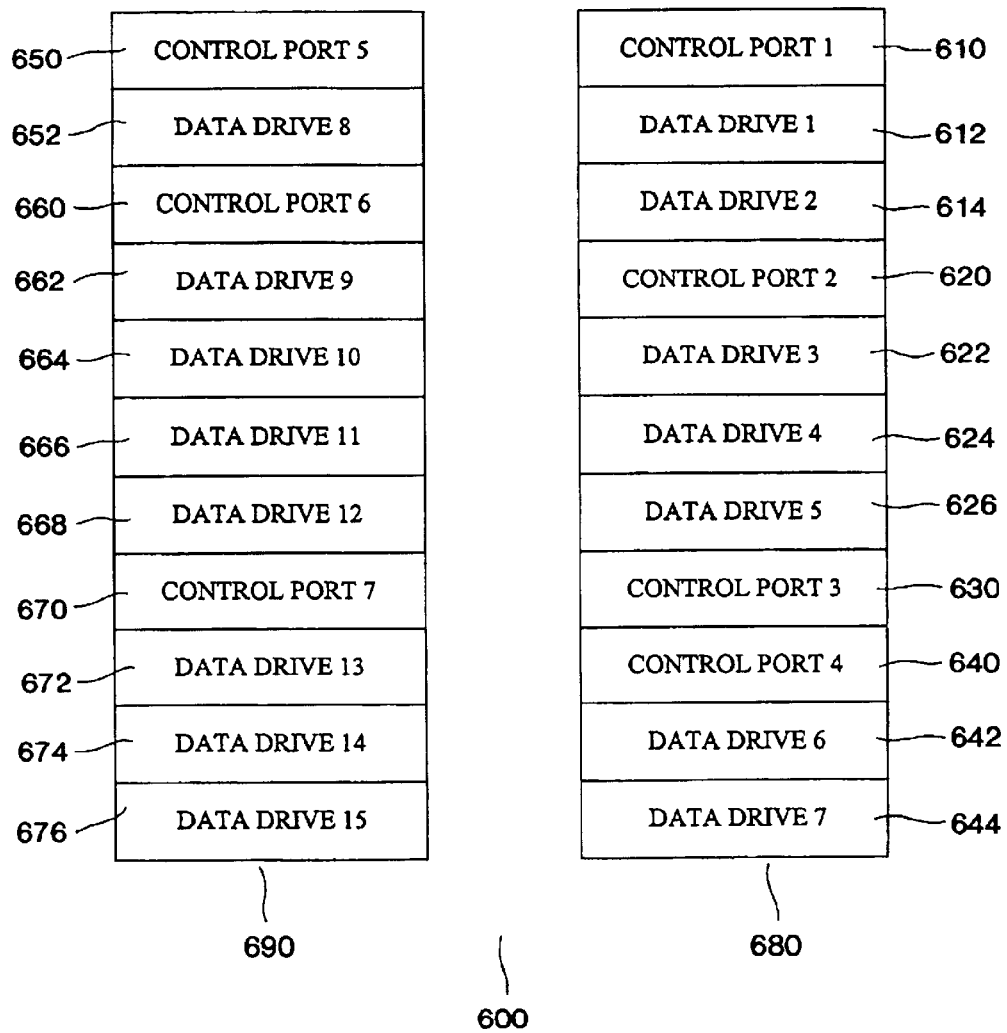
FIG. 6 shows a listing of control ports and data storage drives comprising data storage and retrieval system 600.

FIG. 6 illustrates such an inventory of control ports and data storage drives. In this example, data storage and retrieval system 600 includes seven (7) control ports, namely devices 610, 620, 630, 640, 650, 660, and 670, and fifteen (15) data storage drives, i.e. devices 612, 614, 622, 624, 626, 642, 644, 652, 662, 664, 666, 668, 672, 674, and 676.

In Applicants' data storage and retrieval system 600, the seven control ports and fifteen data storage drives are physically disposed in two assemblies, sometimes called frames. Frame 680 includes control ports 610, 620, 630, and 640, and data storage drives 612, 614, 622, 624, 626, 642, and 644. Frame 690 includes control ports 650, 660, and 670, and data storage drives 652, 662, 664, 666, 668, 672, 674, and 676. In alternative embodiments, Applicants' data storage and retrieval system includes a single frame. In still other embodiments, Applicants' data storage and retrieval system includes more than two frames. Embodiments which include multiple frames may also include multiple accessors and/or multiple media changer control cards.

Figure 7:
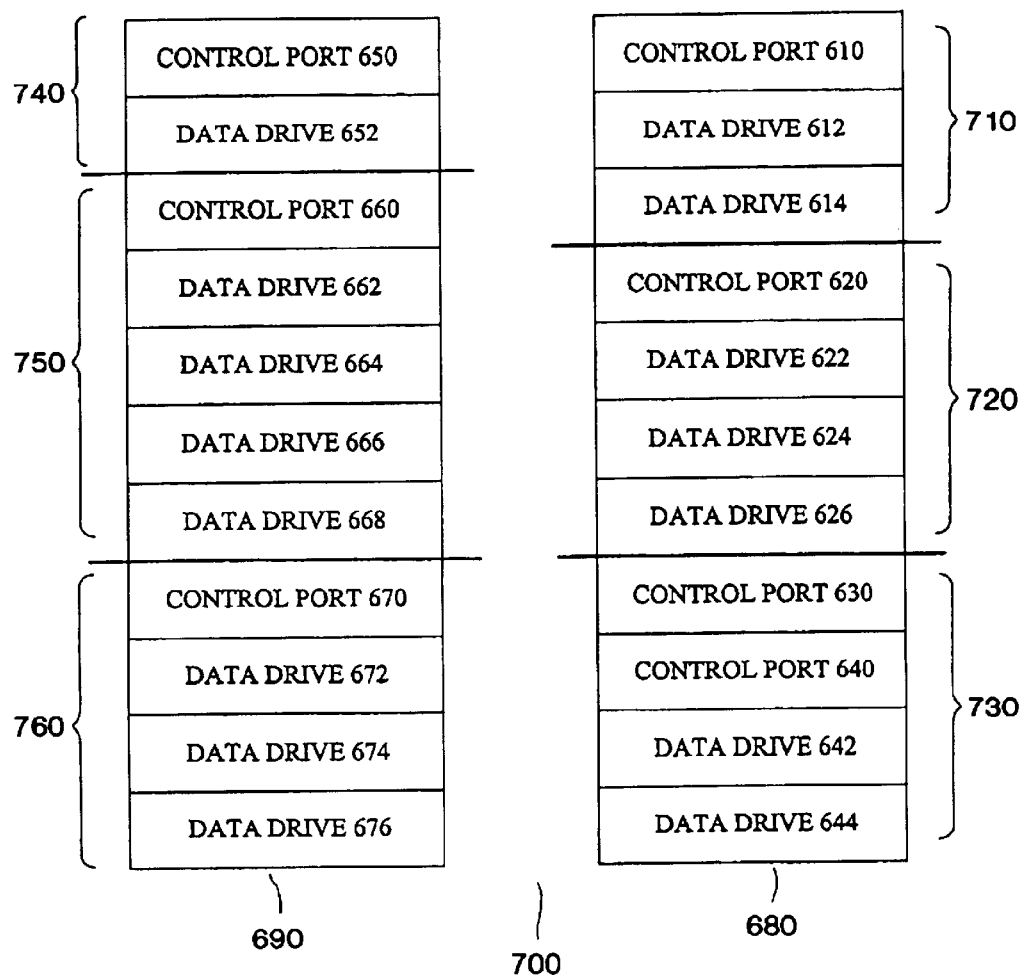
FIG. 7 shows the control ports and data storage drives of system 600 arranged in six different potential logical libraries.

Referring again to FIG. 5, in step 520 controller 150 (FIG. 1)/microprocessor 324 (FIGS. 3, 4A, 4B) next maps the identified control ports and data storage drives into potential logical libraries. FIG. 7 shows system resources map 700 wherein the control ports and data storage drives disposed in frame 680 (FIG. 6) and in frame 690 (FIG. 6) are grouped into the maximum number of potential logical libraries. Each potential logical library must contain at least one control port and at least one drive unit.

Potential logical library 710 includes control port 610 and data storage drives 612 and 614. Potential logical library 720 includes control port 620 and data storage drives 622, 624, and 626. Potential logical library 730 includes control ports 630 and 640 in combination with data storage drives 642 and 644. Potential logical library 740 includes control port 650 and data storage drive 652. Potential logical library 750 includes control port 660 and data storage drives 662, 664, 666, and 668. Potential logical library 760 includes control port 670 and data storage drives 672, 674 and 676.

Figure 8:
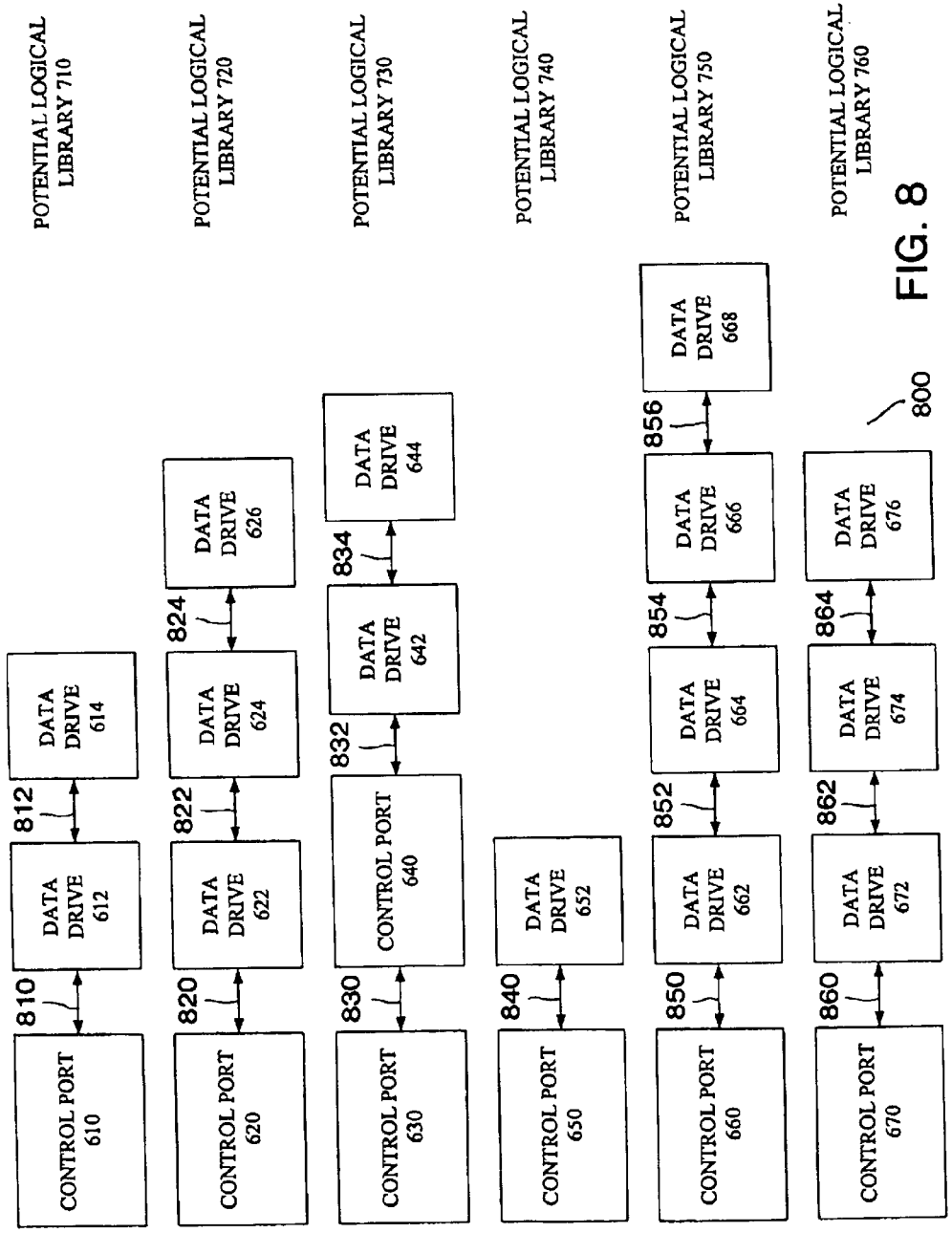
FIG. 8 shows the configurations for the six potential logical libraries of system 600.

FIG. 8 shows system configuration 800 which includes the control ports and data storage drives shown in FIG. 7 along with the buses between those control ports and data storage drives. As those skilled in the art will appreciate, a "bus" in a digital computer system is a circuit consisting of one or more conductors for interconnecting major components of a digital computer which transfers electric signals from one component connected to the bus to another component connected to the bus. Referring again to FIG. 8, interconnections 810, 812, 820, 822, 824, 830, 832, 834, 840, 850, 852, 854, 856, 860, 862, and 864 are each selected from the group comprising a SCSI interconnection, a Fibre Channel interconnection, and combinations thereof.

As those skilled in the art will appreciate, the plurality of control ports and the plurality of data storage drives disposed in Applicants' system are not necessarily interconnected using the individual communication links shown in FIG. 8. Rather in certain embodiments, one or more control ports and one or more data storage drives are "daisy-chained" to one or more buses disposed within Applicants' system.

Referring again to FIG. 5, in step 530 controller 150 (FIG. 1)/microprocessor 324 (FIGS. 3, 4A, 4B) determines the maximum number, $T_{MAX}$, of possible logical libraries based upon the physical mapping of control ports and data drives. FIG. 9 shows a system resources map for the system described above having seven (7) control ports and fifteen (15) data storage drives. As resources map 900 shows, system 600 (FIG. 6) could be partitioned into a total of six (6) potential logical libraries. Thus, $T_{MAX}$ for system 600 (FIG. 6) is 6.

Figure 10:
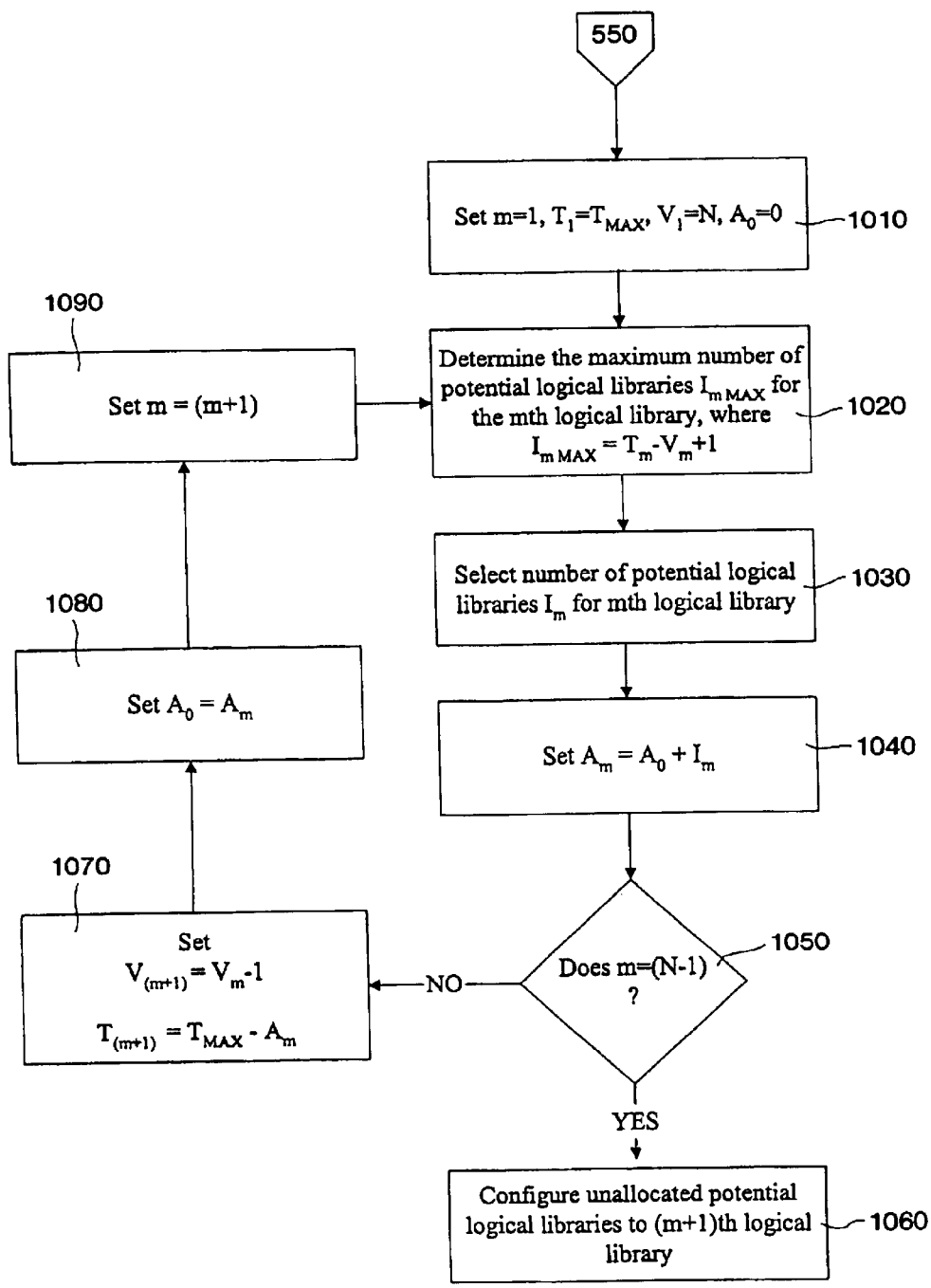
FIG. 10 is a flowchart summarizing steps in a first embodiment of Applicants' method to partition a data storage and retrieval system into (N) logical libraries.

In step 540 (FIG. 5), controller 150 (FIG. 1)/microprocessor 324 (FIGS. 3, 4A, 4B) queries the user to set the number (N) of logical libraries to configure. FIG. 10 summarizes one embodiment of Applicants' method to partition a data storage and retrieval system into (N) logical libraries.

Three examples using these two embodiments of Applicants' method are discussed below. In Example 1, system 600 (FIG. 6) is partitioned into two (2) logical libraries using a first embodiment of Applicants' method. In Example 2, system 600 is partitioned into three (3) logical libraries using a first embodiment of Applicants' method. In Example 3, system 600 is partitioned into three (3) logical libraries using a second embodiment of Applicants' method.

Examples 1, 2, and 3 are presented to further illustrate to persons skilled in the art how to use Applicants' method, and to identify presently preferred embodiments thereof. These examples are not intended as limitations, however, upon the scope of Applicants' invention, which is defined only by the appended claims.

EXAMPLE 1

Referring to FIG. 10, in step 1010 certain variables are initialized. These variables are summarized in Table 1.

TABLE I

| | |
|---|---|
| $T_{MAX}$ | Maximum number of potential logical libraries available |
| (N) | Number of logical libraries to configure |
| $T_m$ | Number of potential logical libraries available at start of process to configure the mth logical library |
| $V_m$ | Number of unconfigured logical libraries at start of process to configure the mth logical library |
| $A_0$ | Number of potential logical libraries allocated before configuring the mth logical library |
| $A_m$ | Number of potential logical libraries allocated after configuring the mth logical library |
| $I_{mMAX}$ | Maximum number of potential logical libraries available for the mth logical library |
| $I_m$ | Number of potential logical libraries included in the mth logical library |

In this Example 1, $T_{MAX}=6$ and (N)=2. Because when m=1 in step 1010 no potential logical libraries have yet been allocated to any logical libraries, $A_0$ is set to equal 0. Because when m=1 in step 1010 no logical libraries have yet been configured, $V_1$ is set to equal (N). Thus, $V_1$ is set equal to 2. In this embodiment of Applicants' method, the partition criteria include: (i) each logical library must include at least one control port, (ii) each logical library must begin with a control port, and (iii) each logical must include at least one data storage drive.

In step 1020, controller 150 (FIG. 1)/microprocessor 324 (FIGS. 3, 4A, 4B) determines the maximum number $I_{m\,MAX}$ of potential logical libraries available for the mth logical library using Equation I.

$$I_{m\,MAX} = T_m - V_m + 1 \qquad \text{Equation I}$$

In configuring the first logical library in this Example 1, $I_1$ MAX equals the total number of unallocated potential logical libraries $T_1$, minus $V_1$, the number of logical libraries remaining to be configured, plus 1. As noted above, in step 1010 $T_1$ was set equal to 6 and $V_1$ was set equal to 2. Therefore, $I_{1\,MAX}$ equals 5. Thus, in partitioning system 600 into two logical libraries, the first logical library could include as many as five potential logical libraries.

FIG. 11 shows partition map 1100. Partition line 1110 is adjusted to reflect an $I_{1\,MAX}$ equaling 5, Under such a partition, system 600 (FIG. 6) would be partitioned into a first logical library which includes (5) potential logical libraries, namely potential logical libraries 710, 720, 730, 740, and 750, and a second logical library comprising a single potential logical library, namely potential logical library 760.

In step 1030 (FIG. 10), controller 150 (FIG. 1)/microprocessor 324 (FIGS. 3, 4A, 4B) queries the user to select the number of drives to include in the first logical library. Referring again to FIG. 11, using this embodiment of Applicants' method the first logical library could be configured to include as few as two (2) data storage drives or as many twelve (12) data storage drives. By selecting the number of drives, the user indirectly selects the number of potential logical libraries as annotated in step 1030 (FIG. 10).

In step 1030, the user selects the number of data storage drive units to include in the logical library being configured.

In certain embodiments, controller 150 (FIG. 1)/microprocessor 324 (FIGS. 3, 4A, 4B) queries the user using a series of text messages displayed on a visual display device. In these embodiments, the user responds to those queries using a data entry device, such as a keyboard or a set of buttons comprising a "YES" button and a "NO" button. The default configuration for the first logical library includes two data drives, namely drives 612 and 614. Therefore in step 1030, controller 150 (FIG. 1)/microprocessor 324 (FIGS. 3, 4A, 4B) asks whether the user wants more than two data drives included in the first logical library. If the response to that first query is "NO," then the first logical library is configured to include only potential logical library 710. On the other hand, if the response to that first query is "YES," then controller 150 (FIG. 1)/microprocessor 324 (FIGS. 3, 4A, 4B) asks whether the user wants more than five (5) data drives included in the first logical library.

In this Example 1, controller 150 (FIG. 1)/microprocessor 324 (FIGS. 3, 4A, 4B) could propound as many as four (4) queries in order to configure the first logical library. These queries would, in essence, comprise: (i) more than 2 drives?, (ii) more than 5 drives?, (iii) more than 7 drives?, (iv) more than 8 drives? If the responses to each of these five queries is "YES," then controller 150 (FIG. 1)/microprocessor 324 (FIGS. 3, 4A, 4B) would configure the first logical library to include potential logical libraries 710, 720, 730, 740, and 750. In this Example, the user's response to query (ii) is "NO," and controller 150 (FIG. 1)/microprocessor 324 (FIGS. 3, 4A, 4B) configures first logical library 1210 (FIG. 12) to include potential logical libraries 710 and 720, which include data storage drives 612, 614, 622, 624, and 626.

In alternative embodiments, controller 150/microprocessor 324 first visually displays the default configuration for the logical library being configured. For example in configuring the first logical library in Example 1, the user would see a visual display that reads "TWO DRIVES." If the user desires to include more than two drives, the user then presses an "up button." After pressing that up button once, the visual displays changes to read "FIVE DRIVES." At this point in the drive selection process, a "down button" is also activated. If the user now presses the down button, the visual display changes to again read "TWO DRIVES."

On the other hand, when the display device reads "FIVE DRIVES," if the user again presses the up button, then the displays changes to read "SEVEN DRIVES." Thus, by pressing the up button and/or the down button the user selects the number of drives to include in the first logical library. That selection is made by pressing an "enter button." As those skilled in the art will appreciate, the "up button" and/or the "down button" and/or the "enter button" may comprise one or more physical device(s) disposed in close proximity to the visual display device, or may comprise one or more "touch screen" portion(s) of the visual display device. In this Example 1, the user elects to include five (5) data storage drives in the first logical library.

In step 1040, the number of potential logical libraries allocated $A_m$ is set to equal $A_0$, the number of potential logical libraries previously allocated, plus $I_m$, the number of potential logical libraries allocated to the mth logical library. In this Example 1, the first logical library is configured to include two potential logical libraries, and therefore, $I_1$ equals 2. Thus after configuring first logical library 1210 (FIG. 12), $A_m$ equals 2.

In step 1050, controller 150 (FIG. 1)/microprocessor 324 (FIGS. 3, 4A, 4B) ascertains if m equals (N−1). In Example 1, after configuring the first potential library m equals 1, and N equals 2. Therefore, m does equal (N−1). This being the case, Applicants' method transitions to step 1060. In step 1060, controller 150 (FIG. 1)/microprocessor 324 (FIGS. 3, 4A, 4B) configures second logical library 1220 to include potential logical libraries 730, 740, 750, and 760, which include data storage drives 642, 644, 652, 662, 664, 666, 668, 672, 674, and 676. Configuration map 1200 (FIG. 12) shows the partition of system 600 (FIG. 6) into first logical library 1210 and second logical library 1220.

EXAMPLE 2

In Example 2, system 600 is configured to include three logical libraries. Referring again to FIG. 10, in step 1010 certain variables are initialized. In this Example 2, $T_{MAX}=6$ and N=3. Because in step 1010 when m=1 no potential logical libraries have yet been allocated to any logical libraries, $A_0$ is initially set to equal 0. Because in step 1010 when m=1 no logical libraries have yet been configured, $V_1$ is set to equal N. Thus, $V_1$ is set equal to 3.

In step 1020, controller 150 (FIG. 1)/microprocessor 324 (FIGS. 3, 4A, 4B) determines the maximum number $I_{m\ MAX}$ of potential logical libraries available for the mth logical library. In configuring the first logical library in Example 2, $I_{m\ MAX}$ equals the total number of unallocated potential logical libraries $T_1$, i.e. 6, minus $V_1$, the number of logical libraries remaining to be configured, i.e. 3, plus 1. Therefore, $I_{1\ MAX}$ equals 4. Thus, in partitioning system 600 into three logical libraries, the first logical library could include as many as four potential logical libraries.

FIG. 13 shows partition map 1300. Partition line 1310 is adjusted to reflect an $I_{1\ MAX}$ equaling 4, Under such a partition, system 600 (FIG. 6) would be partitioned into a first logical library which comprises four (4) potential logical libraries, namely potential logical libraries 710, 720, 730, and 740. Unallocated potential logical libraries 750 and 760 would then be reserved for the second logical library and the third logical library, respectively.

In step 1030 (FIG. 10), the user selects the number of data drives to include in the first logical library in the manner described above. Referring again to FIG. 13, the first logical library could be configured to include as few as two (2) data storage drives by partitioning system 600 such that only potential logical library 710 is included in that first logical library. On the other hand, the first logical library could be configured to include as many eight (8) data storage drives.

In this Example 2, the user elects to include five (5) data storage drives in the first logical library. Controller 150 (FIG. 1)/microprocessor 324 (FIGS. 3, 4A, 4B) configures first logical library 1410 (FIG. 14) to include potential logical libraries 710 and 720, and data storage drives 612, 614, 622, 624, and 626. FIG. 14 comprises configuration map 1400 which shows first logical library 1410 including potential logical libraries 710 and 720. Hence, potential logical libraries 730, 740, 750, and 760 remain unallocated.

In step 1040, the number of potential logical libraries allocated $A_m$ is set to equal $A_0$, the number of potential logical libraries previously allocated, plus $I_m$, the number of potential logical libraries allocated to the mth logical library. Because the first logical library is configured to include two potential logical libraries, $I_1$ equals 2. Therefore after configuring first logical library 1410, $A_m$ equals 2.

In step 1050, controller 150 (FIG. 1)/microprocessor 324 (FIGS. 3, 4A, 4B) ascertains if m equals (N−1). In this Example 2, after configuring the first logical library m equals 1, and N equals 3. Therefore, m does not equal (N−1). This being the case, Applicants' method transitions to step 1070.

In step 1070 (FIG. 10), $V_2$ is set to equal $V_1-1$. Because $V_1$ equals 3, $V_2$ is set to equal 2. $T_2$, which represents the number of unallocated potential logical libraries, is set to equal $T_{MAX}$, i.e. 6, minus $A_1$, i.e. the two potential logical libraries already allocated. Therefore in Example 2, $T_2$ equals 6 minus 2, or 4. In step 1080, $A_0$ is set to equal $A_m$. Thus, $A_0$ is set to equal 2. In step 1090, m is set to equal m+1. Thus, m is incremented to equal 2.

In step 1020, controller 150 (FIG. 1)/microprocessor 324 (FIGS. 3, 4A, 4B) determines the maximum number $I_{2\ MAX}$ of potential logical libraries available for the second logical library. In configuring the second logical library in this Example 2, $I_{2\ MAX}$ equals the total number of unallocated potential logical libraries $T_2$, i.e. 4, minus $V_2$ the number of logical libraries remaining to be configured, i.e. 2, plus 1. Therefore, $I_{2\ MAX}$ equals 3. Thus, in partitioning system 600 into three logical libraries, if the first logical library is configured to include two (2) potential logical libraries, the second logical library could include as many as three (3) potential logical libraries.

FIG. 15 shows partition map 1500. Partition line 1510 is adjusted to reflect an $I_{2\ MAX}$ equaling 3. Under such a partition, the second logical library would be configured to include seven (7) data storage drives, namely drives 642, 644, 652, 662, 664, 666, and 668.

In step 1030 (FIG. 10), the user selects the number of data storage drives to include in the second logical library in the manner described above. Referring again to FIG. 15, the second logical library could be configured to include as few as two (2) data storage drives by partitioning system 600 such that only potential logical library 730 is included in that second logical library. On the other hand, the second logical library could be configured to include as many seven (7) data storage drives.

In Example 2, the user elects to include three (3) data storage drives in the second logical library. Therefore, controller 150 (FIG. 1)/microprocessor 324 (FIGS. 3, 4A, 4B) configures second logical library 1610 (FIG. 16) to include potential logical libraries 730 and 740, and data storage drives 642, 644, and 652. FIG. 16 comprises configuration map 1600 which shows first logical library 1410 including potential logical libraries 710 and 720 and second logical library 1610 including potential logical libraries 730 and 740. Thus, potential logical libraries 750 and 760 remain unallocated.

In step 1040, the number of potential logical libraries allocated $A_2$ is set to equal $A_0$, the number of potential logical libraries previously allocated, plus $I_2$, the number of potential logical libraries allocated to the second logical library. Because second logical library is configured to include two potential logical libraries, $I_2$ equals 2. Therefore, after configuring second logical library 1610 $A_m$ equals 4.

In step 1050, controller 150 (FIG. 1)/microprocessor 324 (FIGS. 3, 4A, 4B) ascertains if m equals (N−1). In this Example 2, after configuring the second logical library m equals 2, and N equals 3. Therefore, m does equal (N−1). This being the case, Applicants' method transitions to step 1060.

In step 1060, controller 150 (FIG. 1)/microprocessor 324 (FIGS. 3, 4A, 4B) configures third logical library 1710 to include potential logical libraries 750 and 760 which include data storage drives 662, 664, 666, 668, 672, 674, and 676. Configuration map 1700 (FIG. 17) shows the partition of system 600 (FIG. 6) into first logical library 1410, second logical library 1610, and third logical library 1710. FIG. 18 summarizes the values for the various parameters used to configure logical libraries 1410, 1610, and 1710 using Equation I.

Figure 21:
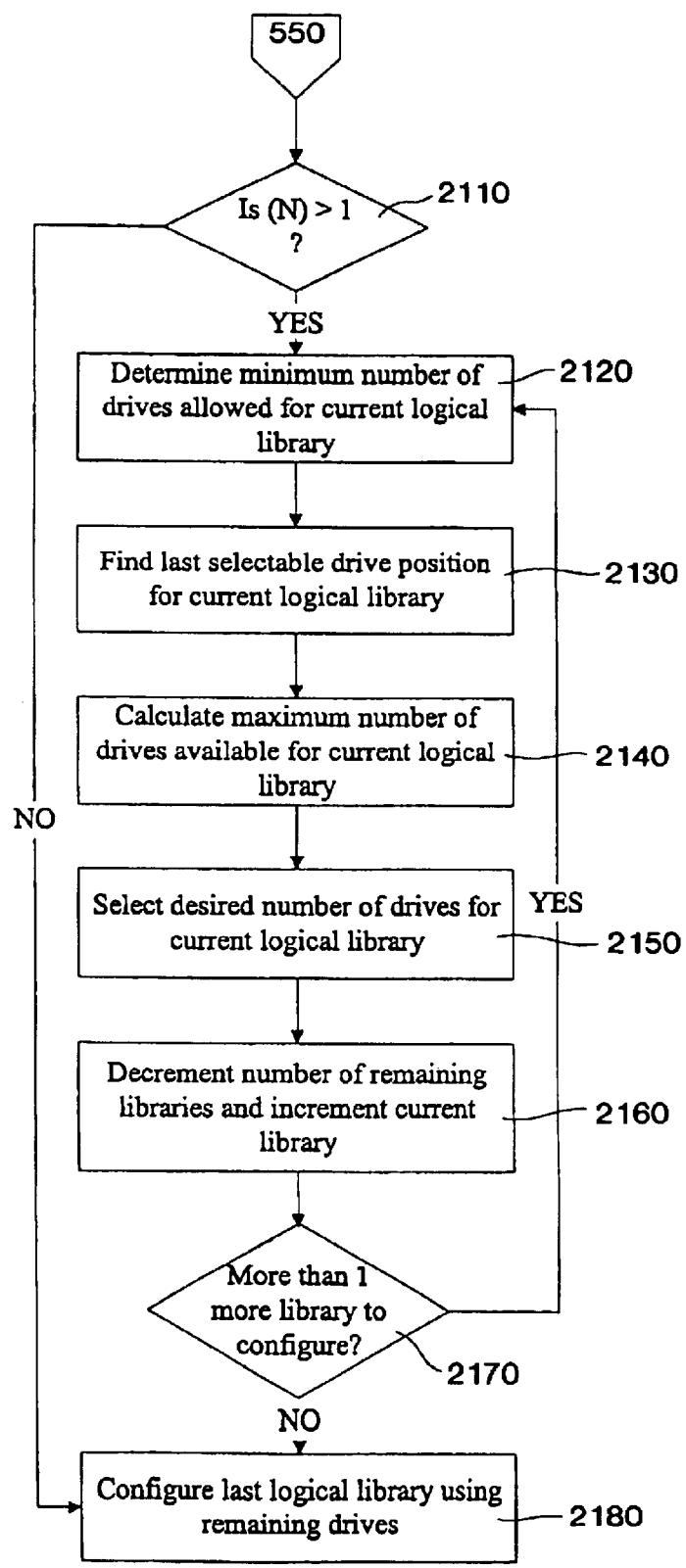
FIG. 21 is a flowchart summarizing steps in a second embodiment of Applicants' method to partition a data storage and retrieval system into (N) logical libraries.

FIGS. 5 and 21 summarize a second embodiment of Applicants' method to configure (N) logical libraries. FIGS. 22A, 22B, 22C, and 22D recite computer code, written in the programming language C, to implement this embodiment of Applicants' method. Referring again to FIG. 5, in steps 510 and 520 control ports and drive units are inventoried and a device map is created in the manner described above.

EXAMPLE 3

Example 3 illustrates this embodiment of Applicants' method using library 600 shown in FIG. 6. Library 600 includes seven (7) control ports and fifteen (15) data storage drives. In step 530, controller 150 (FIG. 1)/microprocessor 324 (FIGS. 3, 4A, 4B) determines the maximum number of potential logical libraries available using the resources map recited in FIG. 6. FIG. 22A recites computer code to implement this step using this embodiment of Applicants' method. In this embodiment of Applicants' method, three (3) partition criteria must be met. Under these partition criteria, a potential logical library: (i) must contain at least one control port, (ii) must contain at least one data storage drive, and (iii) must be configured such that at least one data storage drive is disposed adjacent at least one control port, with empty slots being ignored.

Figure 23A:
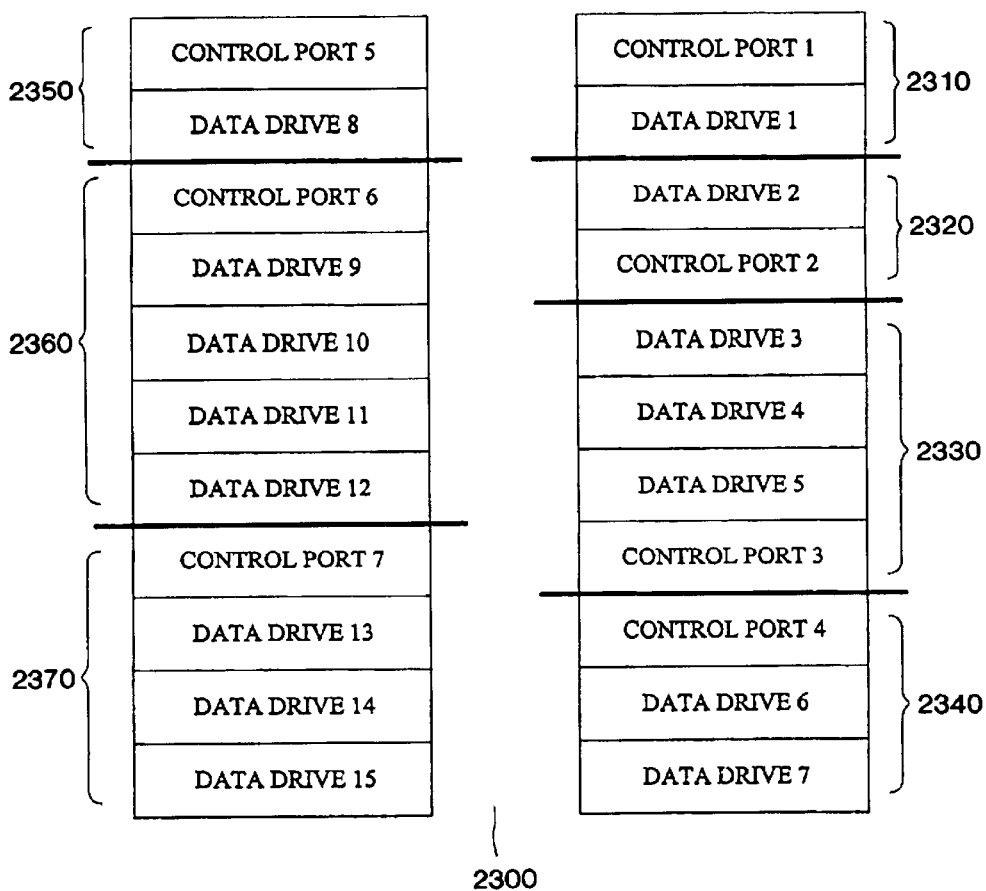
FIG. 23A is a system resources map showing seven potential logical libraries configured from the system shown in FIG. 6.

System 600 includes seven (7) control ports, and based upon the physical mapping shown in FIG. 6, could, at the most, be partitioned into seven (7) potential logical libraries. FIG. 23A shows resources map 2300 comprising one possible partition of library 600, using the partition criteria set forth, above into seven potential logical libraries, i.e. potential logical libraries 2310, 2320, 2330, 2340, 2350, 2360, and 2370. Each of these seven potential logical libraries: (i) includes at least one control port, (ii) includes at least one drive unit, and (iii) includes at least one drive unit disposed adjacent a control port.

Referring now to FIG. 21, in step 2110 controller 150 (FIG. 1)/microprocessor 324 (FIGS. 3, 4A, 4B) determines whether the user has elected to configure system 600 into more than a single logical library. In the event the user elects to configure a single logical library, then Applicants' method transitions to step 2180 where all seven control ports and all fifteen drive units are configured in a single logical library.

Example 3 partitions library 600 into three logical libraries using this second embodiment of Applicants' method. In this Example 3, (N) equals three, and therefore, is greater than 1. Thus, Applicant's method to partition library 600 into three logical libraries transitions from step 2110 to step 2120 to partition the first logical library. In step 2120, Applicants' method determines the minimum number of drive units that can be configured in the first logical library while meeting the partition criteria described above.

Figure 23B:
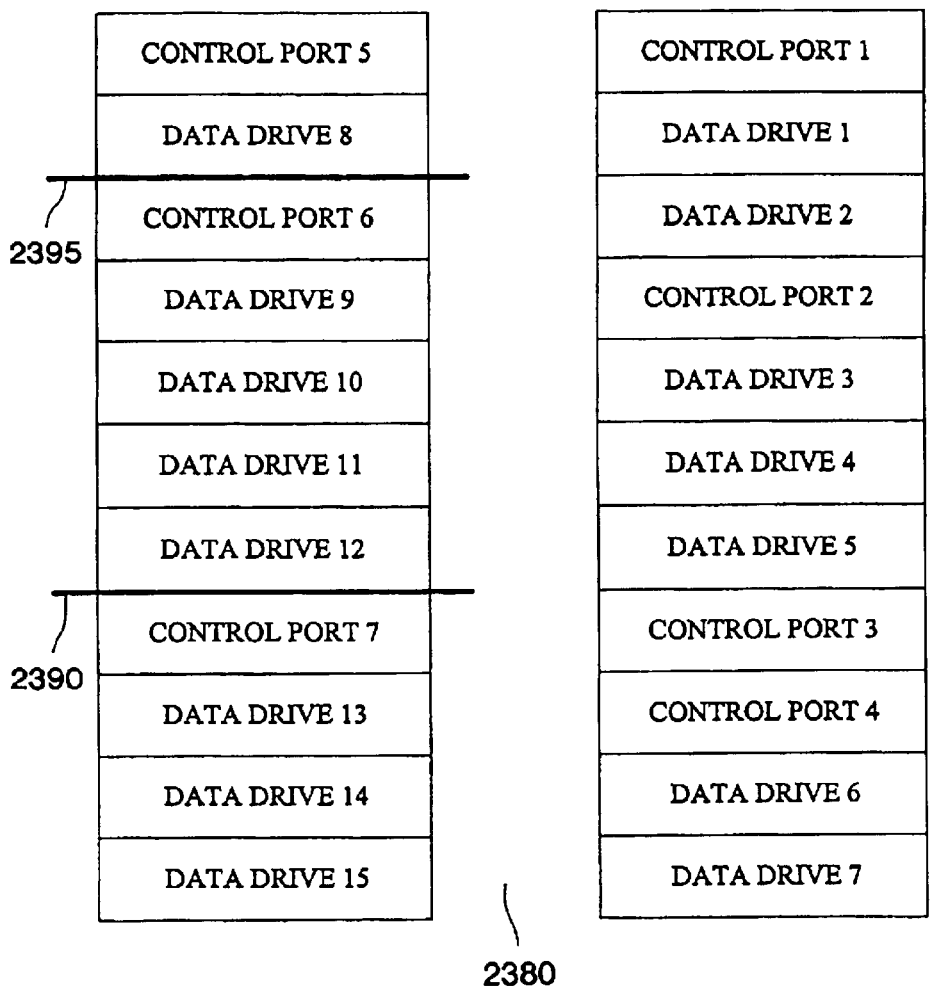
FIG. 23B is a system resources map showing two potential logical libraries reserved while configuring a first logical library using the method of FIG. 21.

Referring to FIG. 23B, Table 2382 recites values for certain computer code parameters used to configure the first logical library. These parameters are described in FIG. 22A. These values/parameters include: (i) currentLogLib=1, which indicates the first logical library is being configured; and (ii) remPotential=2, which indicates that two potential logical libraries are being reserved for inclusion in the second and third logical libraries. Resources map 2380 includes reservation indicators 2390 and 2395. Indicator 2390 shows that control port 7 is reserved for inclusion in the third logical library. Reservation indicator 2395 shows that control port 6 is reserved for inclusion in the second logical library.

Figure 24:
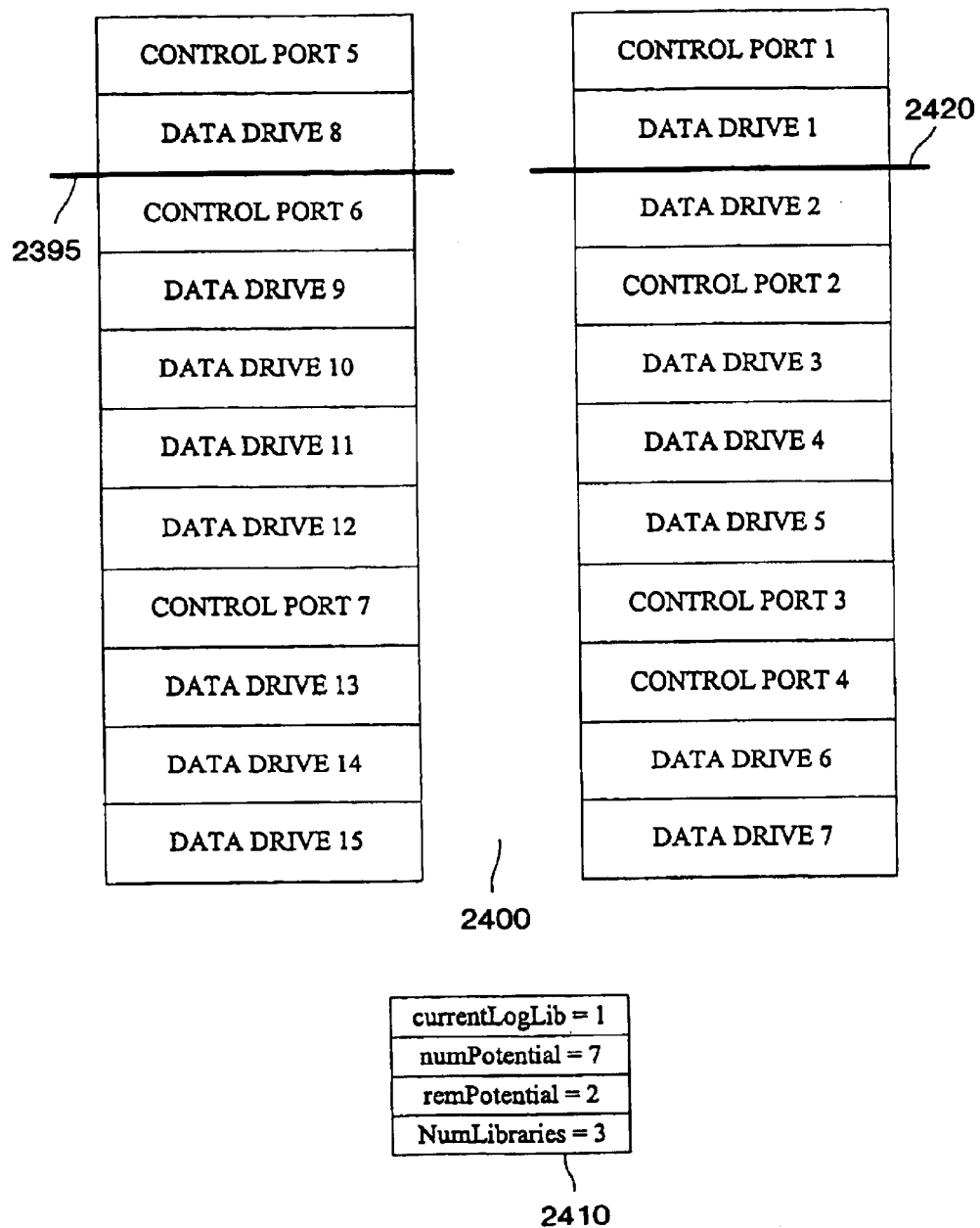
FIG. 24 is a system resources map showing the minimum and maximum number of data storage drive units that could be included in a first logical library using the method of FIG. 21.

In step 2120 (FIG. 21), controller 150 (FIG. 1)/microprocessor 324 (FIGS. 3, 4A, 4B) determines the minimum number of drive units that can be configured in the current logical library. FIG. 22B recites computer code to implement this step. Referring to FIG. 24, partition line 2420 indicates that the first logical library could be configure to include a single data storage drive and meet the partition criteria. As FIG. 24 shows, control port 1 and data drive 1 comprise that minimum configuration for the first logical library.

In step 2130, controller 150 (FIG. 1)/microprocessor 324 (FIGS. 3, 4A, 4B) finds the last selectable drive position for the current logical library. FIG. 22C recites computer code to implement this step. Referring again to FIG. 24, partition line 2395 indicates that data drive 8 is the last selectable data drive unit that can be configured in the first logical library. Control ports 6 and 7 are held in reserve for inclusion in the second and third logical libraries, respectively. Thus, in step 2140 controller 150 (FIG. 1)/microprocessor 324 (FIGS. 3, 4A, 4B) calculates that the first logical library of Example 3 could include as many as eight data drive units.

Figure 25:
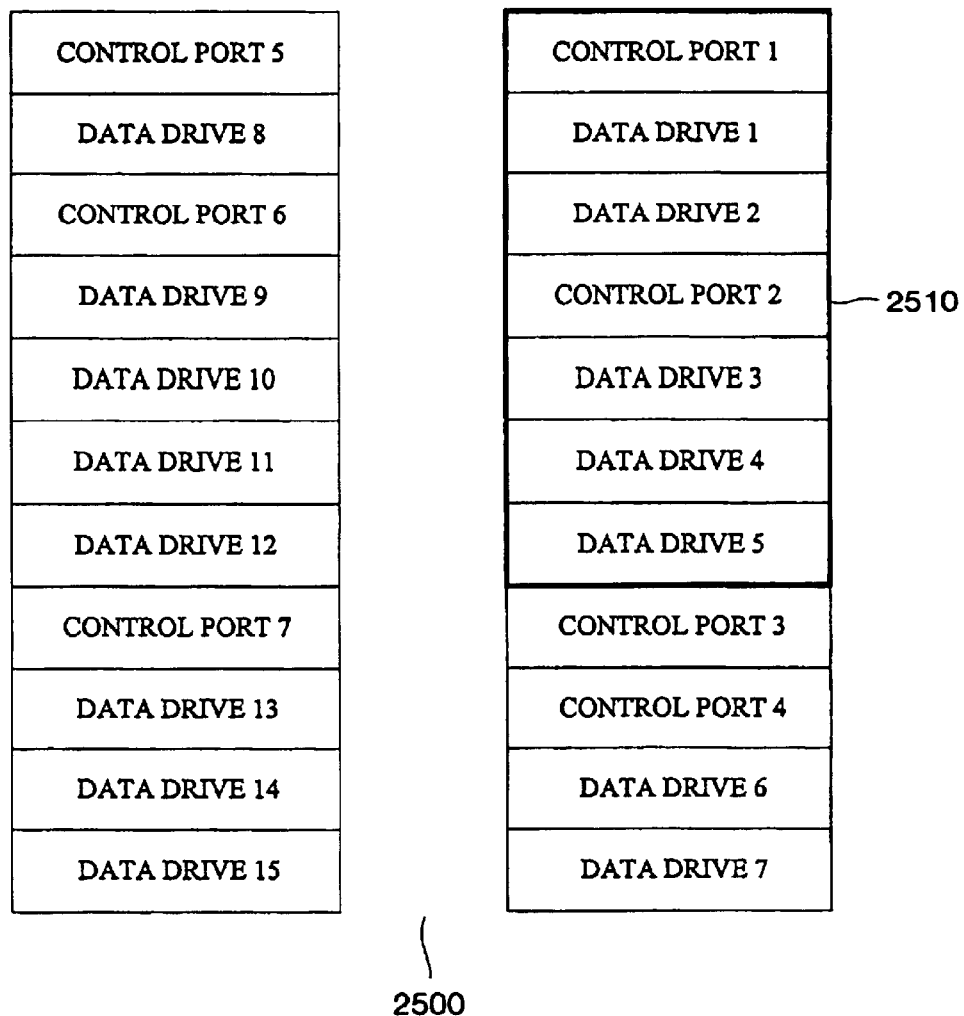
FIG. 25 is a system resources map showing the data storage drive and control port units included in a first logical library using the method of FIG. 21.

In step 2150 of this embodiment of Applicants' method, the user can elect to include 1, 2, 3, 4, 5, 6, 7, or 8, drive unit(s) in the first logical library. The user selects the number of drives to include in the first logical library in the manner described above in Examples 1 and 2. In Example 3, the user elects to include five (5) drive units in the first logical library. FIG. 25 shows logical library 2510 configured to include five data drives, i.e. drive units 1, 2, 3, 4, and 5. Logical library 2510 also includes two control ports, namely control ports 1 and 2.

Figure 26:
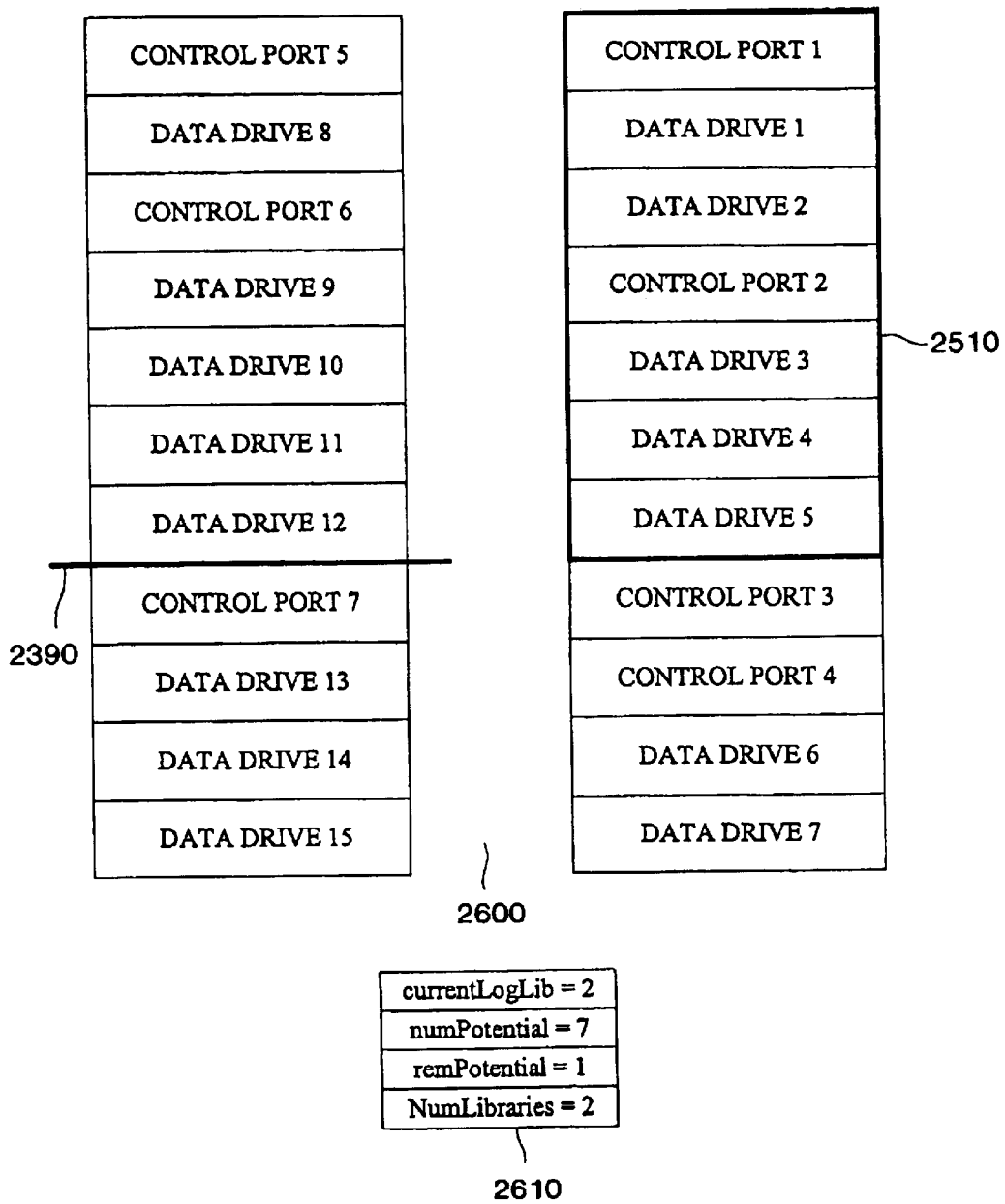
FIG. 26 is a system resources map showing a first logical library and one potential logical library reserved while configuring a second logical library using the method of FIG. 21.

In step 2160, the number of remaining libraries to be configured is decremented by 1, and the current logical library is incremented by 1. FIG. 26 shows resource map 2600 which shows logical library 2510, and reservation indicator 2390. FIG. 26 also recites Table 2610 wherein: (i) currentLogLib has been increased from 1 to 2; (ii) remPotential, i.e. the number of potential logical libraries held in reserve, has been decremented to 1; and (iii) NumLibraries, i.e. the number of logical libraries remaining to be configured, has been decremented to 2.

Figure 27:
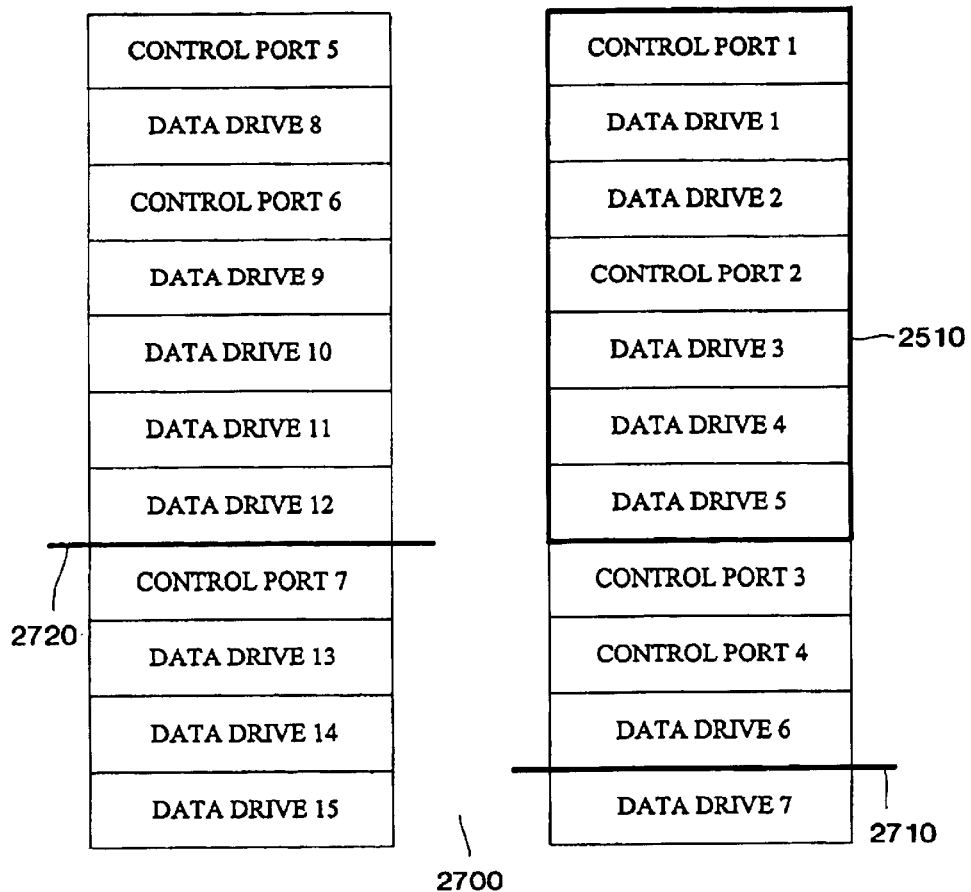
FIG. 27 is a system resources map showing the minimum and maximum number of data storage drive units that could be included in a second logical library using the method of FIG. 21.

Because NumLibraries equals 2, more than one logical library remains to be configured, and Applicants' method transitions to step 2120 to configure the second logical library. In step 2120, Applicants' method determines the minimum number of drives allowed for the second logical library using the three partition criteria discussed above. Partition line 2710 shows that the second logical library could be configured to include a single data drive, namely data drive 6, and meet the partition criteria recited above. In step 2130, controller 150 (FIG. 1)/microprocessor 324 (FIGS. 3, 4A, 4B) finds the last selectable drive unit for possible inclusion in the second logical library. Partition line 2720 (FIG. 27) shows that data drive 12 comprises that last selectable drive unit. Thus in step 2140, controller 150 (FIG. 1)/microprocessor 324 (FIGS. 3, 4A, 4B) calculates that as many as six drive units can be included in the second logical library. These six data drive units include data drives 7, 8, 9, 10, 11, and 12.

Figure 28:
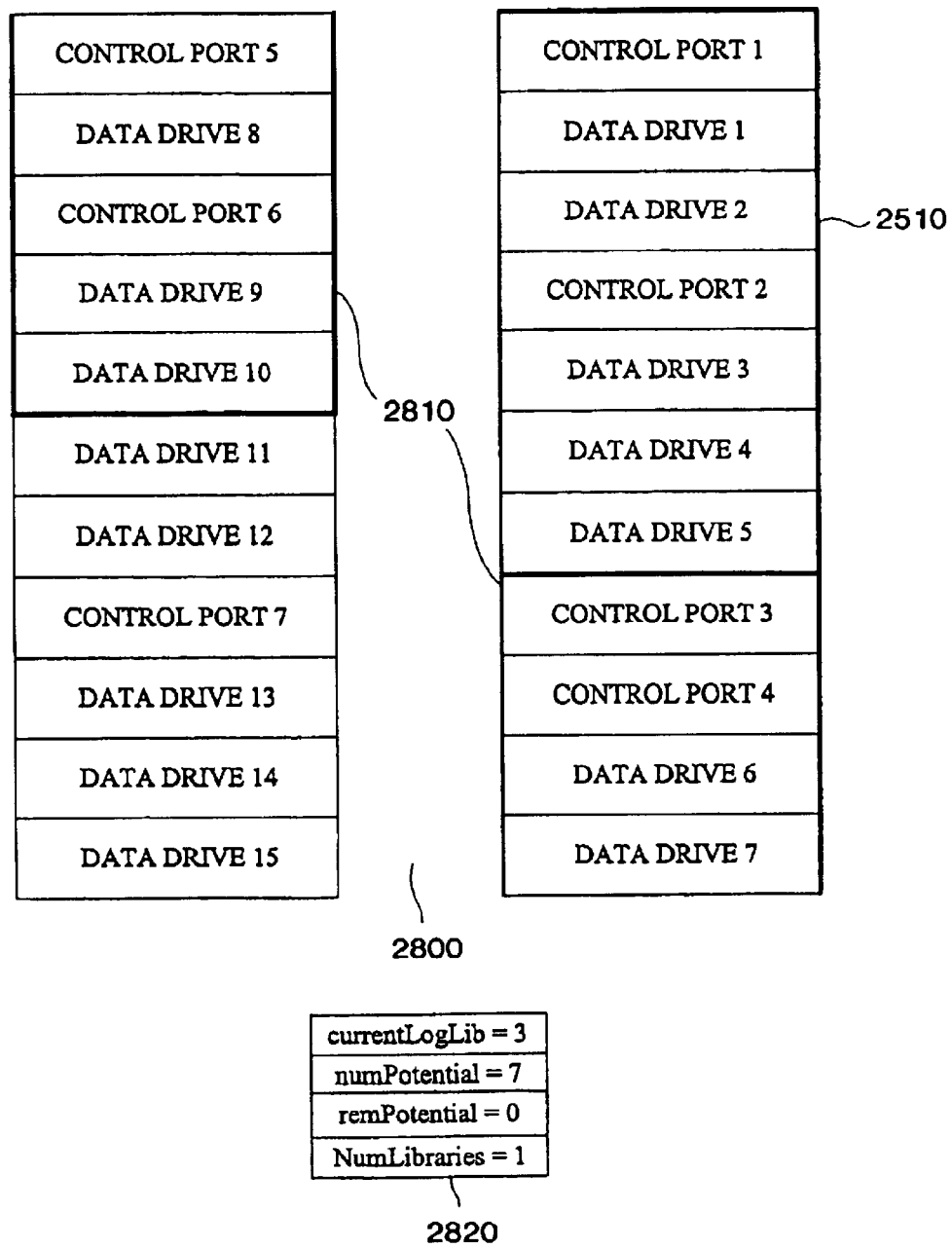
FIG. 28 is a system resources map showing the data storage drive units included in a first logical library and in a second logical library using the method of FIG. 21.

In this Example 3, the user in step 2150 elects to includes five (5) data drive units in the second logical library. FIG. 28 shows resources map 2800 which includes first logical library 2510 and second logical library 2810. In accord with step 2160, Table 2820 shows: (i) currentLogLib is now 3, (ii) remPotential is now 0, and (iii) NumLibraries is now 1. Because only a single logical library remains to be configured, Applicants' method transitions from step 2170 to step 2180.

Figure 29:
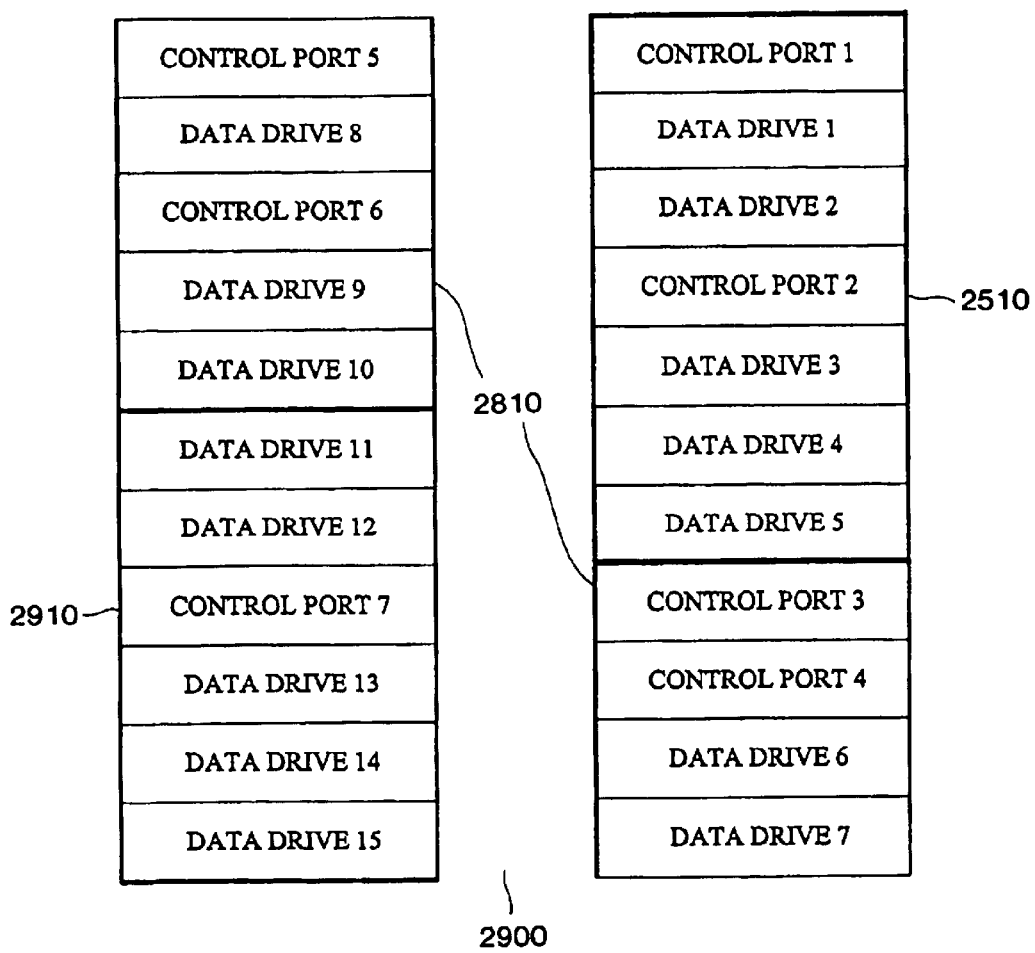
FIG. 29 is a system resources map showing the data storage drive units included in a first logical library and in a second logical library and in a third logical library using the method of FIG. 21.

In step 2180, controller 150 (FIG. 1)/microprocessor 324 (FIGS. 3, 4A, 4B) configures the third logical library to include the remaining drive units, i.e. data drives 11, 12, 13, 14, and 15. FIG. 29 shows the configurations for first logical library 2510, second logical library 2810, and third logical library 2910.

Storage slot assignment may be part of the configuration steps of the three example configurations described herein. As one skilled in the art will recognize, this may be a simple process of querying the user for the desired number of storage slots for each logical library. For example, the user may be queried for the number of desired storage slots after being queried for the number of desired drives. In the case, the storage slot query may occur after step 2150 (FIG. 21) or after step 1030 (FIG. 10).

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to partition a data storage and retrieval system into one or more logical libraries, said data storage and retrieval system comprising a library controller, one or more data storage drives and one or more control ports. compising the steps of:

manually inputting the identity each of said one or more control ports;

manually inputting the location of each of said one or more control ports;

manually inputting the identity of each of said one or more data storage drives;

manually inputting the location of each of said one or more data storage drives;

identifying each of said one or more control ports and each of said one or more data storage drives;

creating a resources map including each of said one or more control ports and each of said one or more data storage drives;

determining the maximum number of potential logical libraries that can be configured using said resources map;

selecting the number (N) of logical libraries to configure; and partitioning said data storage and retrieval system into (N) logical libraries.

2. A method to partition a data storage and retrieval system into one or more logical libraries, said data storage and storage and retrieval system comprising a library controller, one or more data storage drives and one or more control ports, comprising the steps of;

inquiring of said one or more of control ports the identity of each of said one or more control ports;

inquiring of said one or more of data storage the identity of each of said one or more data storage drives;

creating a resources map including each of said one or more control ports and each of said one or more data storage drives;

determining the maximum number of potential logical libraries that can be configured using said resources map;

selecting the number (N) of logical libraries to configure; and partitioning said data storage and retrieval system into (N) logical libraries.

3. The method of claim 2, wherein said creating step further comprises the steps of:

inquiring of said one or more control ports the location of each of said one or more control ports; and inquiring of said one or more data storage drives the location of each of said one or more data storage drives.

4. A method to partition a data storage and retrieval system into one or more logical libraries, said data storage and retrieval system comprising one or more data storage drives and one or more control ports, comprising the steps of:

identifying each of said one or more control ports and each of said one or more data storage drives;

creating a resources map including each of said one or more control ports and each of said one or more data storage drives;

determining the maximum number of potential logical libraries that can be configured using said resources map;

selecting the number (N) of logical libraries to configure;

determining the maximum number of potential logical libraries $I_{m\ MAX}$ available for the mth logical library using Equation I:

$$I_{m\ MAX} = T_m - V_m + 1 \qquad \text{Equation I}$$

wherein m equals 1 to (N), $T_m$ equals the number of unallocated potential logical libraries before configuring the mth logical library, $V_m$ equals the number of unconfigured logical libraries before configuring the mth logical library; and selecting the number of potential logical libraries $I_m$ to include in the configuration for the mth logical library, wherein $I_{m\ MAX} \geq I_m$.

5. A method to partition a data storage and retrieval system into one or more logical libraries, said data storage and retrieval system comprising one or more data storage drives and one or more control ports, comprising the steps of:

identifying each of said one or more control ports and each of said one or more data storage drives;

creating a resources map including each of said one or more control ports and each of said one or more data storage drives;

determining the maximum number of potential logical libraries that can be configured using said resources map;

selecting the number (N) of logical libraries to configure;

determining the minimum number of data storage drives allowed for the mth logical library, wherein m=1 to (N);

finding the last selectable data storage drive position for the mth logical library;

calculating the maximum number of data storage drives available for the mth logical library; and selecting the desired number of data storage drives to include in the mth logical library.

6. A data storage and retrieval system comprising a computer useable medium having computer readable program code disposed therein for partitioning said data storage and retrieval system into one or more logical libraries, wherein said data storage and retrieval system comprises a library controller, one or more data storage drives and one or more control ports, the computer readable program code comprising a series of computer readable program steps to effect:

receiving manually inputted identities for each of said one or more control ports;

receiving manually inputted locations for each of said one or more control ports;

receiving manually inputted identities for each of said one or more data storage drives;

receiving manually inputted locations for each of said one or more data storage drives;

identifying each of said one or more control ports and each of said one or more data storage drives;

creating a resources map indicating the locations of said one or more control ports and said one or more data storage drives;

determining the maximum number of potential logical libraries that can be configured using said resources map;

selecting the number (N) of logical libraries to configure; and partitioning said data storage and retrieval system into (N) logical libraries.

7. A data storage and retrieval system comprising a computer useable medium having computer readable program code disposed therein for partitioning said data storage and retrieval system into one or more logical libraries, wherein said data storage and retrieval system comprises a library controller, one or more data storage drives and one or more control ports, the computer readable program code comprising a series of computer readable program steps to effect:

inquiring of said one or more control ports the identity of each of said one or more control ports;

inquiring of said one or more data storage drives the identity of each of said one or more data storage drives;

identifying each of said one or more control ports and each of said one or more data storage drives;

creating a resources map indicating the locations of said one or more control ports and said one or more data storage drives;

determining the maximum number of potential logical libraries that can be configured using said resources map;

selecting the number (N) of logical libraries to configure; and partitioning said data storage and retrieval system into (N) logical libraries.

8. The automated data storage and retrieval system of claim 7, wherein said computer readable program code further comprises a series of computer readable program steps to effect:

inquiring of said one or more control ports the location of each of said one or more control ports; and inquiring of said one or more data storage drives the location of each of said one or more data storage drives.

9. A data storage and retrieval system comprising a computer usable medium having computer readable program code disposed therein for partitioning said data storage and retrieval system into one or more logical libraries, wherein said data storage and retrieval system comprises one or more data storage drives, one or more control ports, and one or more potential logical libraries, the computer readable program code comprising a series of computer readable program steps to effect:

identifying each of said one or more control ports and each of said one or more data storage drives;

creating a resources map indicating the locations of said one or more control ports and said one or more data storage drives;

determining the maximum number said potential logical libraries that can be configured using said resources map;

selecting the number (N) of logical libraries to configure;

determining the maximum number of potential logical libraries $T_{m\ MAX}$ available for the mth logical library using Equation I:

$$I_{m\ MAX} = T_m - V_m + 1 \qquad \text{Equation I}$$

wherein m equals 1 to (N), $T_m$ equals the number of unallocated potential logical libraries, $V_m$ equals the number of unconfigured logical libraries; and selecting the number of potential logical libraries $I_m$ to include in the configuration for the mth logical library, wherein $I_{m\ MAX} \geq I_m$.

10. A data storage and retrieval system comprising a computer useable medium having computer readable program code disposed therein for partitioning said data storage and retrieval system into one or more logical libraries, wherein said data storage and retrieval system comprises one or more data storage drives and one or more control ports, the computer readable program code comprising a series of computer readable program steps to effect:

identifying each of said one or more control ports and each of said one or more data storage drives;

creating a resources map indicating the locations of said one or more control ports and said one or more data storage drives;

determining the maximum number of potential logical libraries that can be configured using said resources map;

selecting the number (N) of logical libraries to configure;

determining the minimum number of data storage drives allowed for the mth logical library, wherein m=1 to (N);

finding the last selectable data storage drive position for the mth logical library;

calculating the maximum number of data storage drives available for the mth logical library; and selecting the desired number of data storage drives to include in the mth logical library.

11. A computer program product with a programmable computer processor having computer readable program code embodied therein for partitioning a data storage and retrieval system into one or more logical libraries, wherein said data storage and retrieval system comprises a library controller, one or more data storage drives and one or more control ports, comprising:

computer readable program code which causes said programmable computer processor to receive manually inputted identities for each of said one or more control ports;

computer readable program code which causes said programmable computer processor to receive manually inputted locations for each of said one or more control ports;

computer readable program code which causes said programmable computer processor to receive manually inputted identities for each of said one or more data storage drives;

computer readable program code which causes said programmable computer processor to receive manually inputted locations for each of said one or more data storage drives;

computer readable program code which causes said programmable computer processor to identify each of said one or more control ports and each of said one or more data storage drives;

computer readable program code which causes said programmable computer processor to create a resources map including each of said one or more control ports and each of said one or more data storage drives;

computer readable program code which causes said programmable computer processor to determine the maximum number of potential logical libraries that can be configured using said resources map;

computer readable program code which causes said programmable computer processor to receive manual input selecting the number (N) of logical libraries to configure; and computer readable program code which causes said programmable computer processor to partition said data storage and retrieval system into (N) logical libraries.

12. A computer program product usable with a programmable computer processor having computer readable program code embodied therein for partitioning a data storage and retrieval system into one or more logical libraries, wherein said data storage and retrieval system comprises a library controller, one or more data storage drives and one or more control ports, comprising:

computer readable program code which causes said programmable computer processor to inquire of said one or more control ports the identity of each of said one or more control ports;

computer readable program code which causes said programmable computer processor to inquire of said one or more data storage drives the identity of each of said one or more data storage drives;

computer readable program code which causes said programmable computer processor to create a resources map including each of said one or more control ports and each of said one or more data storage drives;

computer readable program code which causes said programmable computer processor to determine the maximum number of potential logical libraries that can be configured using said resources map;

computer readable program code which causes said programmable computer processor to receive manual input selecting the number (N) of logical libraries to configure; and computer readable program code which causes said programmable computer processor to partition said data storage and retrieval system into (N) logical libraries.

13. The computer program product of claim 12, further comprising:

computer readable program code which causes said programmable computer processor to inquire of said one or more control ports the location of each of said one or more control ports; and computer readable code which causes said programmable computer processor to inquire of said one or more data storage drives the location of each of said one or more storage drives.

14. A computer program product usable with a programmable computer processor having computer readable program code embodied therein for partitioning a data storage and retrieval system into one or more logical libraries, wherein said data storage and retrieval system comprises one or more data storage drives and one or more control ports, comprising:

computer readable program code which causes said programmable computer processor to identify each of said one or more control ports and each of said one or more data storage drives;

computer readable program code which causes said programmable computer processor to create a resources map including each of said one or more control ports and each of said one or more data storage drives;

computer readable program code which causes said programmable computer processor to determine the maximum number of potential logical libraries that can be configured using said resources map;

computer readable program code which causes said programmable computer processor to receive manual input selecting the number (N) of logical libraries to configure;

computer readable program code which causes said programmable computer processor to determine the maximum number of potential logical libraries $I_{m\ MAX}$ available for the mth logical library using Equation I:

$$I_{m\ MAX} = T_m - V_m + 1 \qquad \text{Equation I}$$

wherein m equals 1 to (N), $T_m$ equals the number of unallocated potential logical libraries, $V_m$ equals the number of unconfigured logical libraries; and computer readable program code which causes said programmable computer processor to receive manual input selecting the number of potential logical libraries $I_m$ to include in the configuration for the mth logical library, wherein $I_{m\ MAX} \geq I_m$.

15. A computer program product usable with a programmable computer processor having computer readable program code embodied therein for partitioning a data storage and retrieval system into one or more logical libraries, wherein said data storage and retrieval system comprises one or more data storage drives and one or more control ports, comprising:

computer readable program code which causes said programmable computer processor to identify each of said one or more control ports and each of said one or more data storage drives;

computer readable program code which causes said programmable computer processor to create a resources map including each of said one or more control ports and each of said one or more data storage drives;

computer readable program code which causes said programmable computer processor to determine the maximum number of potential logical libraries that can be configured using said resources map;

computer readable program code which causes said programmable computer processor to receive manual input selecting the number (N) of logical libraries to configure;

computer readable program code which causes said programmable computer processor to determine the minimum number of data storage drives allowed for the mth logical library, wherein m=1 to (N);

computer readable program code which causes said programmable computer processor to find the last selectable data storage drive position for the mth logical library;

computer readable program code which causes said programmable computer processor to calculate the maximum number of data storage drives available for the mth logical library; and computer readable program code which causes said programmable computer processor to select the desired number of data storage drives to include in the mth logical library.

* * * * *